US009464716B2

(12) United States Patent
Farr et al.

(10) Patent No.: US 9,464,716 B2
(45) Date of Patent: Oct. 11, 2016

(54) CYLINDER ASSEMBLY

(71) Applicant: GOMACO Corporation, Ida Grove, IA (US)

(72) Inventors: Thomas C. Farr, Ellendale, MN (US); Mark W. Brenner, Ida Grove, IA (US); Kevin D. Kottke, Storm Lake, IA (US); Stephen B. Jones, Ida Grove, IA (US)

(73) Assignee: GOMACO Corporation, Ida Grove, IA (US)

( * ) Notice: Subject to any disclaimer, the term of this patent is extended or adjusted under 35 U.S.C. 154(b) by 0 days.

(21) Appl. No.: 14/935,241

(22) Filed: Nov. 6, 2015

(65) Prior Publication Data

US 2016/0061327 A1 Mar. 3, 2016

Related U.S. Application Data

(62) Division of application No. 14/492,430, filed on Sep. 22, 2014.

(60) Provisional application No. 61/881,510, filed on Sep. 24, 2013.

(51) Int. Cl.
| | |
|---|---|
| *F16J 1/12* | (2006.01) |
| *B62D 7/02* | (2006.01) |
| *B62D 11/20* | (2006.01) |
| *E01C 19/18* | (2006.01) |
| *E01C 19/22* | (2006.01) |
| *E01C 19/42* | (2006.01) |
| *E01C 19/48* | (2006.01) |

(52) U.S. Cl.
CPC .. *F16J 1/12* (2013.01); *B62D 7/02* (2013.01); *B62D 11/20* (2013.01); *E01C 19/18* (2013.01); *E01C 19/22* (2013.01); *E01C 19/42* (2013.01); *E01C 19/48* (2013.01)

(58) Field of Classification Search
CPC ............ F16J 1/12; B62D 7/20; B62D 11/20; E01C 19/18; E01C 19/22; E01C 19/42; E01C 19/48
USPC ........... 404/108, 98, 72, 101, 105, 104, 112; 180/403, 408, 414, 442, 6.47, 8.11, 180/14.2, 6.48, 9.2, 9.44, 9.46, 9.48; 280/12.11, 763.1, 764.1, 765.1, 766.1, 280/105
See application file for complete search history.

(56) References Cited

U.S. PATENT DOCUMENTS 3,970,405 A * 7/1976 Swisher, Jr. .......... E01C 19/407
404/105
4,029,165 A * 6/1977 Miller .................... B62D 11/20
180/6.48

(Continued)

*Primary Examiner* — Jacob Knutson
(74) *Attorney, Agent, or Firm* — Suiter Swantz pc llo

(57) ABSTRACT

A cylinder assembly may include a cylinder end having a cylinder end opening, a cylinder barrel, a piston, a rod, and a shaft. An opening through the piston forms a sleeve passing through a portion of the piston. The rod extends out of the cylinder barrel and is configured to rotate with respect to the cylinder barrel and the cylinder end. An opening in the rod further forms the sleeve passing through an interior portion of the rod. A protruding end of the shaft passes through the cylinder end opening. A portion of the shaft has a cross-sectional shape corresponding to the cross-section of the sleeve. The protruding end of the shaft is free to rotate within the cylinder end opening in response to a rotation of the rod. The shaft is free to slide within the sleeve in response to an extension or retraction of the rod.

18 Claims, 21 Drawing Sheets

(56) References Cited

U.S. PATENT DOCUMENTS

| | | |
|---|---|---|
| 4,382,736 A | 5/1983 | Thomas |
| 6,508,330 B1 | 1/2003 | Biondi |
| 6,692,185 B2 | 2/2004 | Colvard |
| 6,890,123 B2 * | 5/2005 | Piccoli ................ E01C 19/4893 180/442 |
| 7,681,674 B1 | 3/2010 | Barnes et al. |
| 7,942,604 B2 | 5/2011 | Willis et al. |
| 2002/0089300 A1* | 7/2002 | Uchiyama .......... G01D 5/34738 318/653 |
| 2006/0024134 A1* | 2/2006 | Rio ....................... E01C 23/088 404/94 |
| 2011/0236129 A1* | 9/2011 | Guntert, Jr. ............. E01C 19/42 404/72 |
| 2013/0140802 A1* | 6/2013 | Warr ........................ B60S 9/10 280/766.1 |

* cited by examiner

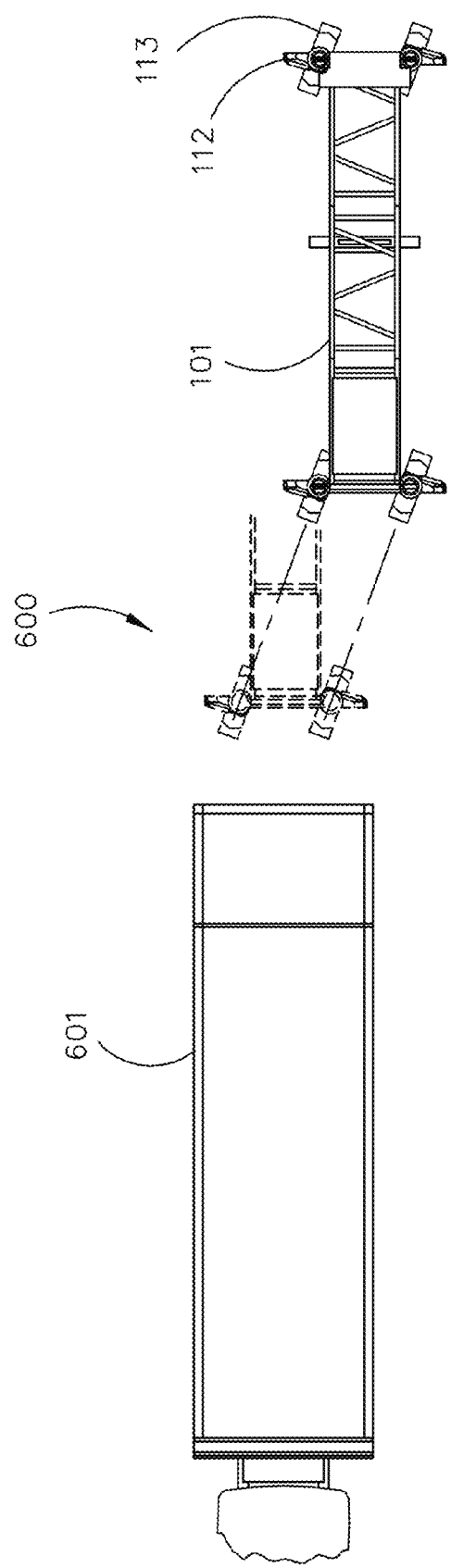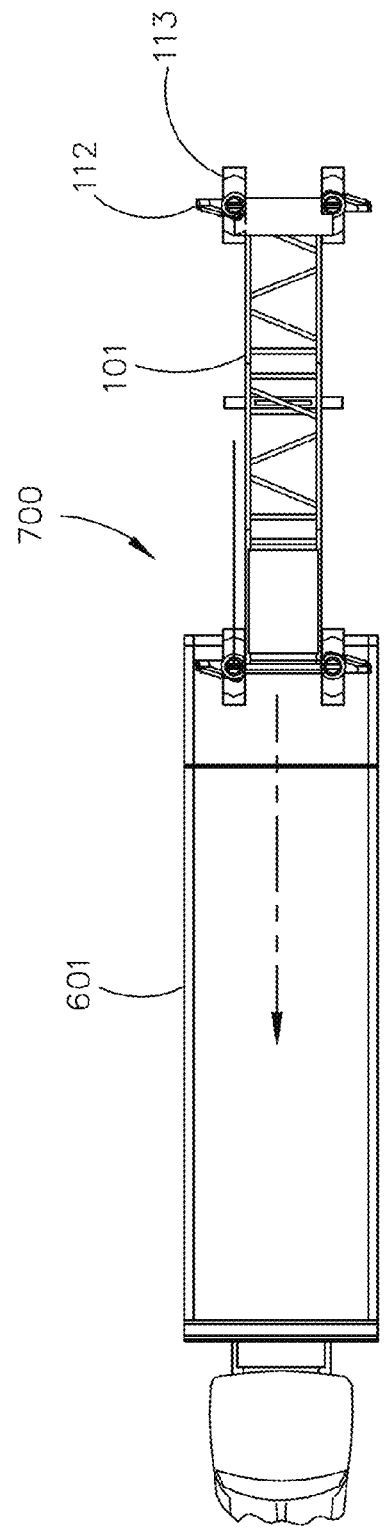
FIG. 6
FIG. 7

CYLINDER ASSEMBLY

CROSS-REFERENCE TO RELATED APPLICATIONS

This application claims the benefit of U.S. patent application Ser. No. 14/492,430, filed Sep. 22, 2014, which claims the benefit of U.S. Provisional Application Ser. No. 61/881,510, filed Sep. 24, 2013; this application is a Divisional of U.S. patent application Ser. No. 14/492,430. U.S. patent application Ser. No. 14/492,430 and U.S. Provisional Application Ser. No. 61/881,510 are herein incorporated by reference in their entirety.

BACKGROUND

Existing paving machines have tracks with limited range of turning rotation. The limited range of turning rotation of the tracks of existing paving machines make maneuvering the paving machine on the jobsite difficult and imprecise. The limited range of turning rotation of the tracks requires large turning radiuses and a large area of available ground to complete turn maneuvers. Often, the turning operation of existing paving machines is the result of driving one side of the existing paving machine's tracks faster than other side of the paving machine's tracks; however, such turning operation results in a turning radius of at least the distance between the two sides of the tracks. Additionally, it is often difficult for existing paving machines to maneuver around paving jobsites because paving jobsites are often laden with obstacles (such as other equipment, job site materials, terrain features, or the like), which are often too tightly spaced for existing paving machines to maneuver around. In some cases, obstacles on a jobsite have to be moved out of the way to accommodate the large turning radii of existing paving machines, and creating additional space for the existing paving machines requires additional man-hours to complete as well as ties up additional equipment to create the additional space. Additionally, in some cases, an existing paving machine cannot physically turn itself into position to perform paving operations on a portion of a jobsite due to the limited range of turning rotation. For example, existing paving machines cannot pave up to the edge of a bridge approach because the existing paving machines would not have enough space to complete a turn after paving up to the edge of a bridge approach; currently, existing paving machines have to veer away from the path of a to-be-paved roadway significantly prior to approaching the edge of a bridge approach so as to clear the bridge approach, and the remaining portion of the roadway up to the edge of the bridge approach has to be paved using slower and more expensive manual techniques. Further, loading and unloading existing paving machines on and off trailers at a jobsite is difficult because of the maneuvering space required to complete turns to position the existing paving machines for loading and unloading them on trailers.

SUMMARY

In one aspect, embodiments of the inventive concepts disclosed herein are directed to a cylinder assembly. The cylinder assembly includes a cylinder end, a cylinder barrel, a piston, a rod, and a rotation position shaft. The cylinder end has a cylinder end opening. The cylinder barrel is attached to the cylinder end. The piston resides within the cylinder barrel, wherein an opening through the piston forms a sleeve passing through a center portion of the piston. The sleeve has a non-circular cross-section. The rod is attached at one end to the piston and at a second end to a rod end. The rod extends out of the cylinder barrel. The rod is configured to extend or retract and configured to rotate with respect to the cylinder barrel and the cylinder end. An opening in the rod further forms the sleeve passing through a central interior portion of the rod. A protruding end of the rotation position shaft passes through the cylinder end opening. A portion of the rotation position shaft further passes through the sleeve formed by the opening through the piston and the opening in the rod. The portion of the rotation position shaft passing through the sleeve has a cross-sectional shape corresponding to the non-circular cross-section of the sleeve. The protruding end of the rotation position shaft is free to rotate within the cylinder end opening in response to a rotation of the rod. The portion of the rotation position shaft is free to slide within the sleeve in response to an extension or retraction of the rod.

Additional embodiments are described in the application including the claims. It is to be understood that both the foregoing general description and the following detailed description are exemplary and explanatory only and are not restrictive. Other embodiments will become apparent.

BRIEF DESCRIPTION OF THE FIGURES

Other embodiments will become apparent by reference to the accompanying figures in which:

FIG. 6 shows a top view of an exemplary machine's drive mechanisms being positioned with respect to a trailer;

FIG. 7 shows a top view of an exemplary machine being loaded on to a trailer;

DETAILED DESCRIPTION

Figure 1:
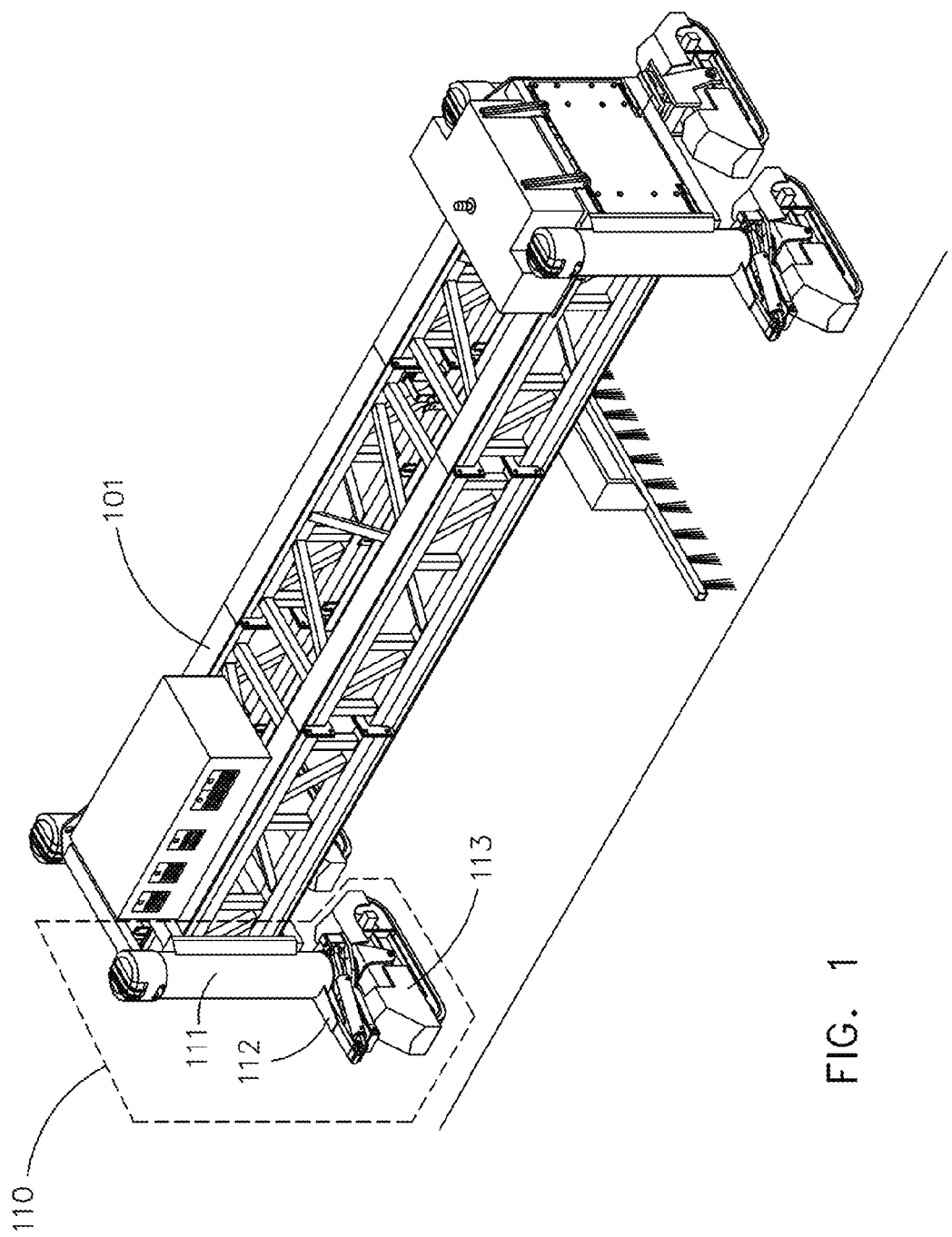
FIG. 1 shows an isometric view of an exemplary machine having a plurality of leg assemblies of some embodiments.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Some embodiments of the invention may include one or more actuating mechanisms (e.g., hydraulic cylinders, electrically powered motors, or the like) to lift or rotate one or more drive mechanisms (e.g., tracks) of a machine (such as a sprayer, trimmer, paver, or the like), which for example, may be suitable for use in a paving train. Some embodiments include actuating mechanisms which induce a rotation in a lifted drive mechanism such that the drive mechanism may be rotated with a range of more than ninety degrees (e.g., 91 degrees, . . . , 144 degrees, or more). In some embodiments, one or more actuating mechanisms comprise a ratchet assembly (which may also be referred to as a ratcheting mechanism) configured to rotate a drive mechanism of a leg assembly of a machine.

In some embodiments, the ratchet assembly may include a ratchet lock bar, which is operatively driven by a cylinder and is configured to engage and disengage into or out of one of a plurality of slots of a ratchet gear. In exemplary embodiments, when the ratchet lock bar is engaged in a particular slot of a ratchet gear, a second cylinder (e.g., a steer cylinder) of the ratchet assembly may extend (or retract) causing the drive mechanism to rotate in a selected direction until a predetermined amount of rotation is reached. Once the predetermined amount rotation is reached, the ratchet lock bar is disengaged from the slot of the ratchet gear; when the ratchet lock bar is disengaged from the ratchet gear, the second cylinder (e.g., the steer cylinder) of the ratchet assembly may retract (or extend) causing the ratchet gear to rotate freely a predetermined or sensed amount until the disengaged ratchet lock bar is aligned with a second particular slot of the ratchet gear and without causing the drive mechanism to rotate. Once the disengaged ratchet lock bar is aligned with the second particular slot of the ratchet gear, the ratchet lock bar may be engaged with the second particular slot, and the second cylinder (e.g., a steer cylinder) of the ratchet assembly may extend (or retract) causing the drive mechanism to further rotate in the selected direction until a selected amount of rotation is reached. In some embodiments, a portion or all of this process may be repeated multiple times until a selected amount of rotation is reached.

Some embodiments include one or more computing devices or controllers being configured to receive sensor data from one or more sensors (e.g., a rotational leg cylinder sensor, a ratchet cylinder sensor, and/or the like), which are configured to sense data indicative of a rotation component of a drive mechanism, such that the one or more computing devices or controllers are configured to determine a rotational orientation (e.g., a degree of rotation with respect to a default position of a particular drive mechanism) of each of the one or more drive mechanisms based at least on the sensor data. Some embodiments of the invention are implemented as, within, in conjunction with, or attached to a machine (e.g., a construction site machine, a machine of a paving train, such as a paving machine, a trimmer, a grader, a sprayer, or the like) configured to be driven with two or more tracks.

Figure 2:
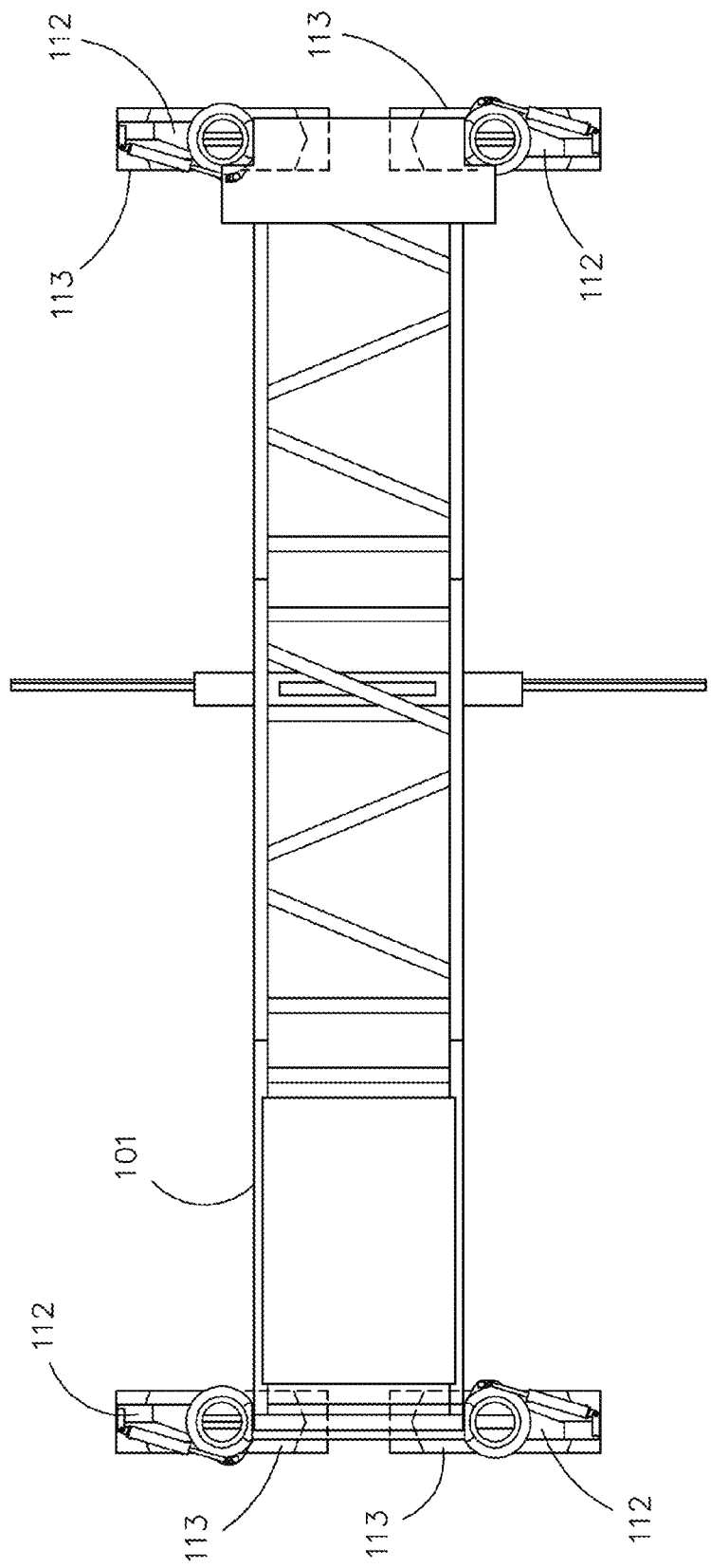
FIG. 2 shows a top view of an exemplary machine having a plurality of leg assemblies of some embodiments.

Referring now to FIGS. 1-2, a machine 101 (e.g., a sprayer, as shown in FIG. 1), which includes a plurality (e.g., 2, 4 (as shown), or more) of leg assemblies 110 of some embodiments is shown. Each of the leg assemblies 110 may include a leg (which, for example, includes an outer leg housing 111), a ratchet assembly 112, and a drive mechanism 113 (e.g., a track, or the like). As shown in FIG. 1, the drive mechanisms 113 of the machine 101 are oriented corresponding to a standard operational mode (e.g., a pave mode), whereby the direction of travel of the machine 101 is configured to correspond to a direction of a paving project, for example.

Figure 3:
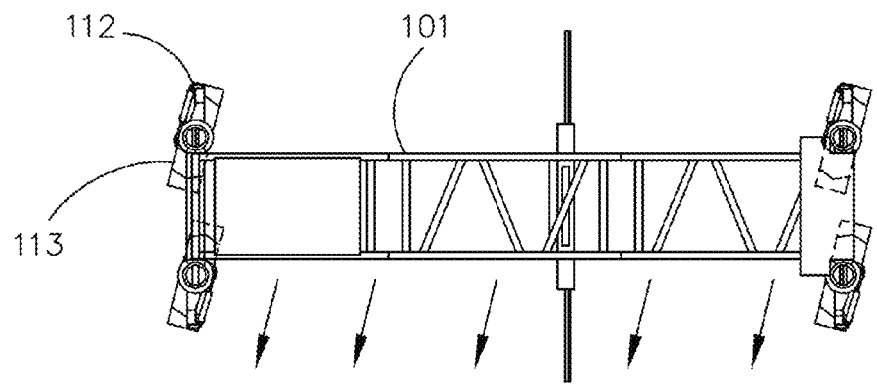
FIG. 3 shows a top view of an exemplary machine with the drive mechanisms rotated by a particular amount.
Figure 4:
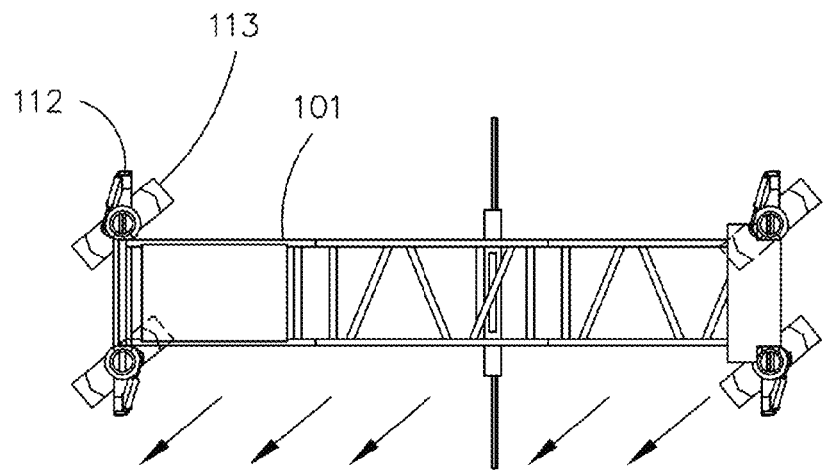
FIG. 4 shows a top view of an exemplary machine with the drive mechanisms rotated by a further particular amount.
Figure 5:
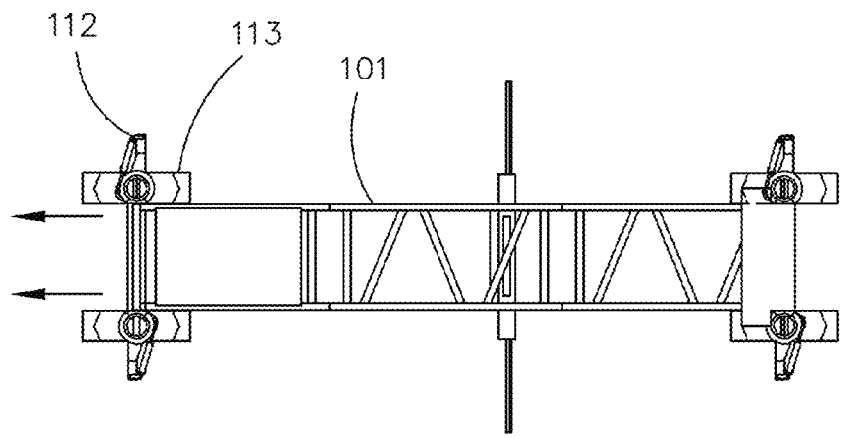
FIG. 5 shows a top view of an exemplary machine with the drive mechanisms rotated by an additional particular amount.

Referring now to FIGS. 3, 4, and 5, exemplary positions of the drive mechanisms 113 of the machine 101 of some embodiments are shown as the drive mechanisms 113 are rotated from a standard mode position to a transport mode position (as shown in FIG. 5). For example, while operating in a transport mode the machine 101 may be driven perpendicularly to a direction corresponding to the standard mode. Operating in the transport mode allows for the machine to be perpendicularly driven off the path of the pave train or quickly loaded onto a trailer 601 (as exemplarily shown in FIGS. 6-7, described below). Additionally, the ability to rotate the drive mechanisms 113 of the machine 101 90 degrees or more allows a paving machine (e.g., a paver) to pave in a standard operating mode up to the edge of a bridge approach and then rotate the drive mechanisms 113 90 degrees such that that paving machine can be driven perpendicularly off of the path of the paving operations at the edge of the bridge approach so as to maximize the amount of the paving project that may be performed by the paving machine.

Referring now to FIGS. 6-7, views 600, 700 depict how the machine may be driven up to a trailer 601 and positioned for quickly loading the machine 101 onto the trailer 601. As shown in FIG. 6, the ratchet assemblies 112 may rotate the drive mechanisms 113 of the machine 101 to a position between the standard operating mode and the transport mode to drive the machine 101 into alignment of the trailer 601. In some embodiments, a front pair of drive mechanisms 113 and rear pair of drive mechanisms 113 may each be angled or rotated differently so that the machine may be positioned in alignment with the trailer 601. Once the machine 101 is in alignment with the trailer 601, the ratchet assemblies 112 may rotate the the drive mechanisms 113 to the transport mode position, and the machine 101 may be driven directly onto the trailer 601, as shown in FIG. 7.

Figure 8A:
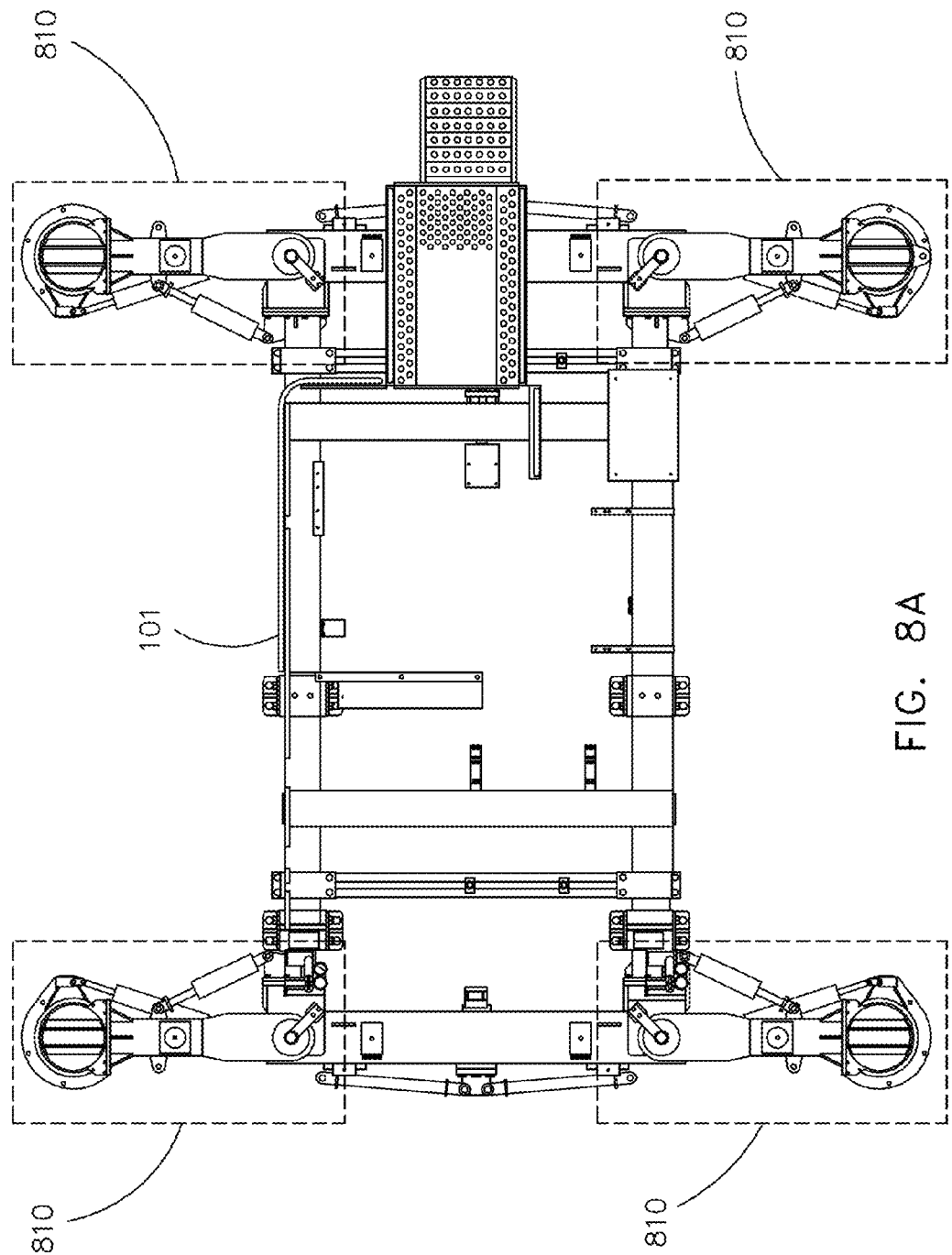
FIG. 8A depicts a top view of a paving machine, which includes a plurality of leg and shoulder joint assemblies.

Referring now to FIG. 8A, a top view of an exemplary machine 101 (e.g., a paving machine, as shown in FIG. 8A), which includes a plurality (e.g., 2, 3, 4 (as shown), or more) of leg and shoulder joint assemblies 810, of some embodiments is shown.

Figure 8B:
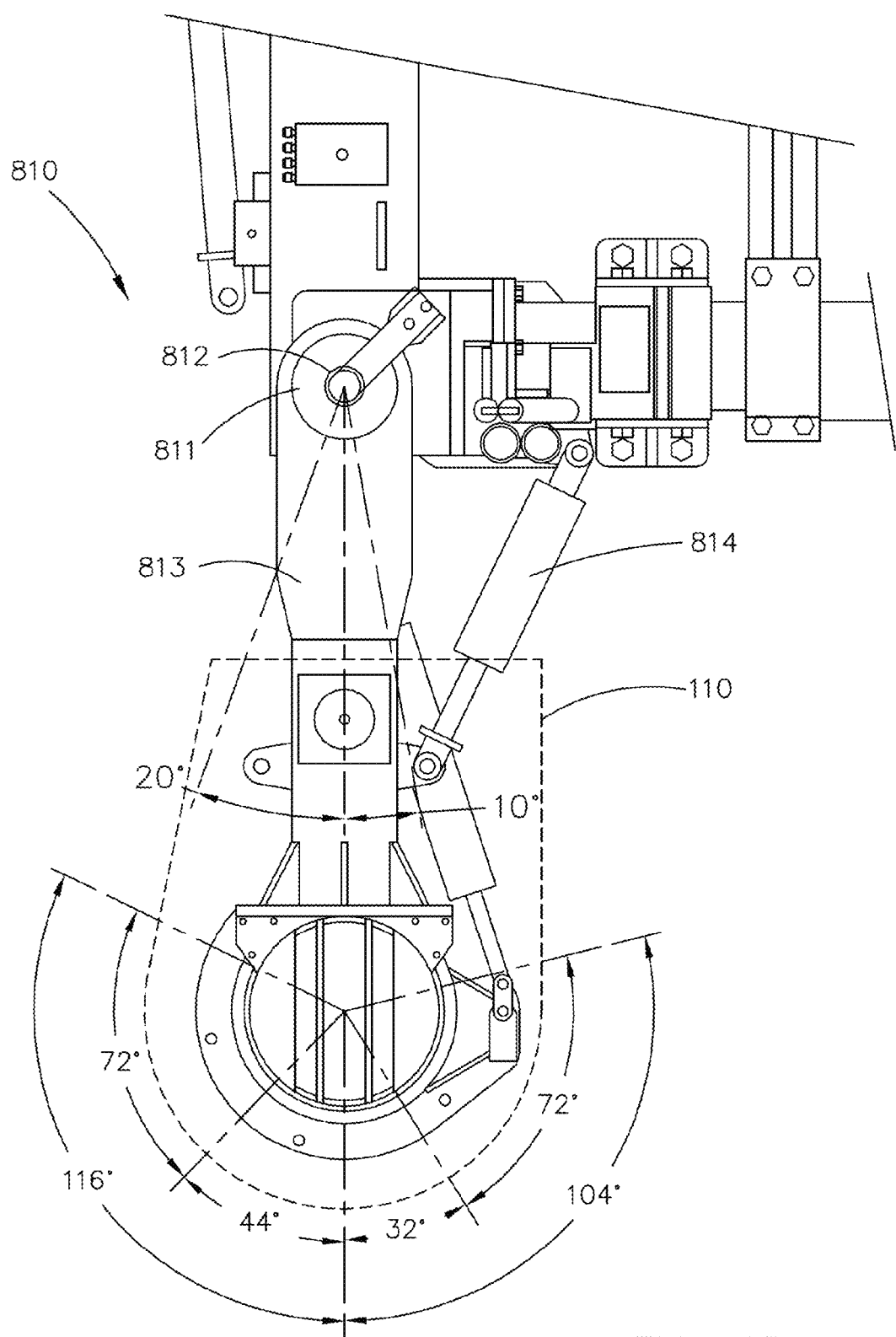
FIG. 8B depicts a top view of an exemplary leg and shoulder joint assembly of some embodiments.

Referring now to FIG. 8B, in some embodiments, each of the leg and shoulder joint assemblies 810 may include a shoulder pivot 811, a shoulder sensor 812, an arm 813, a shoulder position cylinder 814, and a leg assembly 110. In some embodiments, the shoulder pivot 811 is operatively attached to an end-car portion of the machine 101. In some embodiments, the shoulder pivot 811 comprises a pin joint; in other embodiments, the shoulder pivot 811 may comprise a powered cylinder configured to lift or lower the machine 101 in addition to allowing the arm to rotate about an axis of the powered cylinder, and in such embodiments, the powered cylinder may comprise a hydraulically driven cylinder, an electrically powered cylinder, a pneumatically powered cylinder, or the like. In some embodiments, a first end of the arm 813 is attached to the shoulder pivot 811 such that the arm 813 may be rotated about a substantially vertical axis of the shoulder pivot 811, and a second end of the arm 813 is attached to the leg assembly 110. In some embodiments, the angle of rotation of the arm 813 about the shoulder pivot 811 may be adjusted (e.g., increased or decreased) by operating (e.g., extending or retracting) the shoulder position cylinder 814. In some embodiments, a first end of the shoulder position cylinder 814 is attached to a body portion of the machine 101, and a second end of the shoulder position cylinder 814 is attached to the arm 813. In some embodiments, the shoulder position cylinder 814 comprises a hydraulically driven cylinder, an electrically powered cylinder, a pneumatically powered cylinder, or the like. In some embodiments, operation of the shoulder position cylinder 814 is controlled by a computing device (e.g., 2201, or the like), a controller (e.g., master controller 2203, leg controller 2204, or the like), or combinations thereof.

In some embodiments, the shoulder sensor 812 is configured to sense a degree of rotation of the arm 813 about the shoulder pivot 811. The shoulder sensor 812 may be configured to output or send data of the degree of rotation of the arm 813 about the shoulder pivot 811 to a computing device (e.g., 2201, or the like) or a controller (e.g., master controller 2203, leg controller 2204, or the like). In some embodiments, the shoulder sensor 812 is implemented within or attached to the shoulder pivot 811. For example, in exemplary implementations, the shoulder sensor 812 may be implemented within or attached to a top or bottom portion of the shoulder pivot 811; in other implementations, the shoulder sensor 812 may be located above or below the shoulder pivot 811 and within a shoulder pivot cap or housing. In exemplary embodiments, the shoulder sensor 812 may comprise an inductive angle sensor (e.g., an analog inductive angle sensor or a digital inductive angle sensor); however, in other embodiments, the shoulder sensor 812 may comprise any suitable sensor configured to sense a degree of rotation of the arm 813 about the shoulder pivot 811.

Additionally, FIG. 8B shows exemplary suitable ranges of angles of rotation for the shoulder pivot cylinder 811 and the ratchet assembly 112 of the leg assembly 110. For example, as shown in FIG. 8B, in a particular exemplary implementation, the arm 813 may be configured to rotate about the shoulder pivot 811 with a range of thirty degrees of rotation. That is, for example, the arm 813 may be configured to rotate about the shoulder pivot 811 up to ten degrees off perpendicular in a first direction (e.g., generally toward the shoulder position cylinder 814), and the arm 813 may be configured to rotate about the shoulder pivot 811 up to twenty degrees off perpendicular in a second direction (e.g., generally away from the shoulder position cylinder 814). Additionally, for example, as shown in FIG. 8B, in a particular exemplary implementation, the drive mechanism 113 may be configured to rotate about a vertical axis running through the leg with a range of between 216 to 220 degrees of rotation.

Further, in exemplary embodiments which include the leg and shoulder assembly, the combined effect of rotating the drive mechanism 113 about a vertical axis running through the leg and rotating the arm 813 about the shoulder pivot 811 in a same rotational direction (i.e., rotating both the drive mechanism 113 and the arm 813 clockwise or counterclockwise) results in the drive mechanism 113 having a total effective range of rotation greater than the range of rotation for the drive mechanism 113 alone; that is, in particular exemplary embodiment, the total effective range of rotation for the drive mechanism 113 may be approximately 250 degrees.

While particular exemplary ranges of rotation are shown in FIG. 8B and described with respect thereto, it is contemplated that various other suitable ranges of rotation may be implemented in other embodiments.

Figure 9:
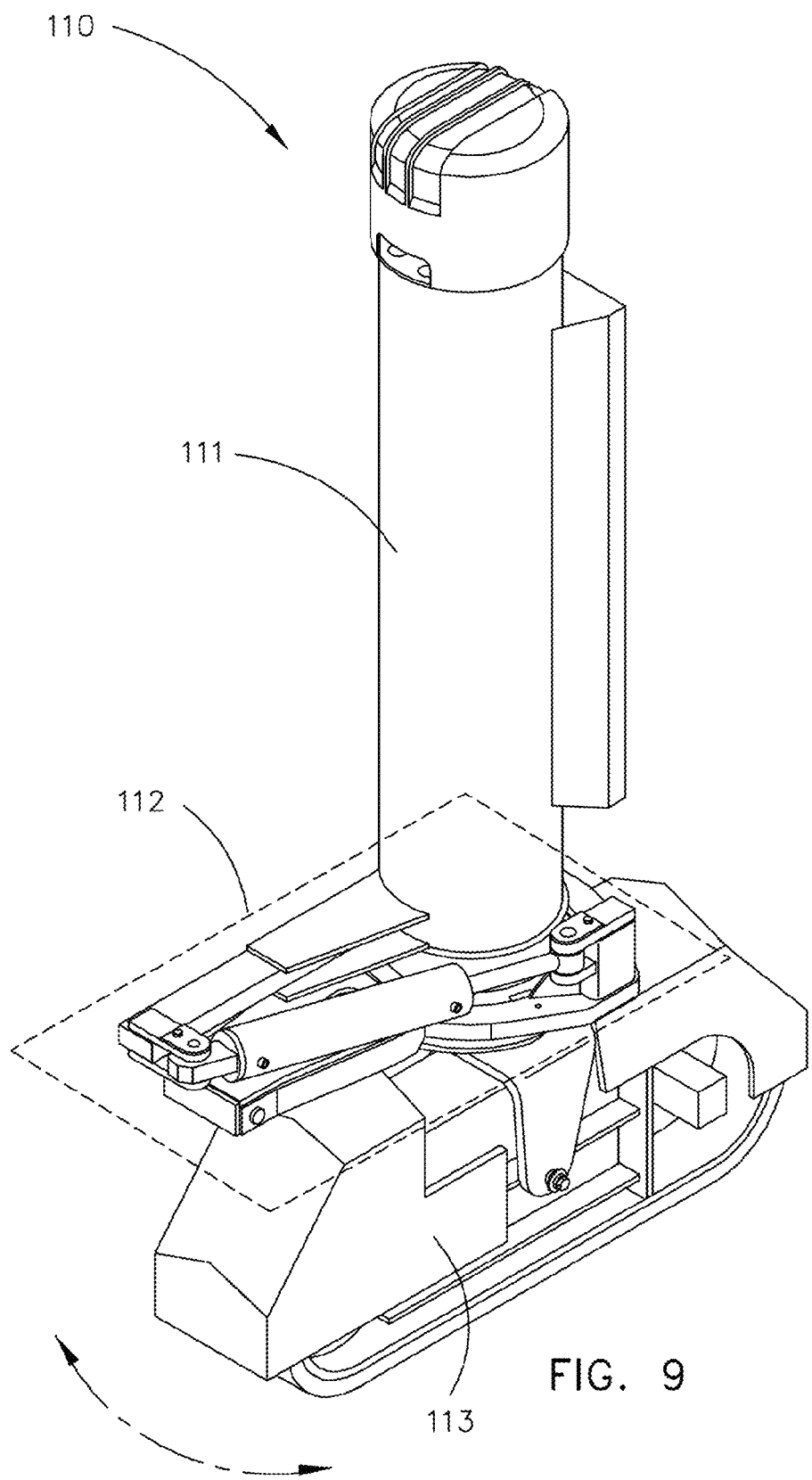
FIG. 9 shows an isometric view of an exemplary leg assembly of some embodiments
Figure 10A:
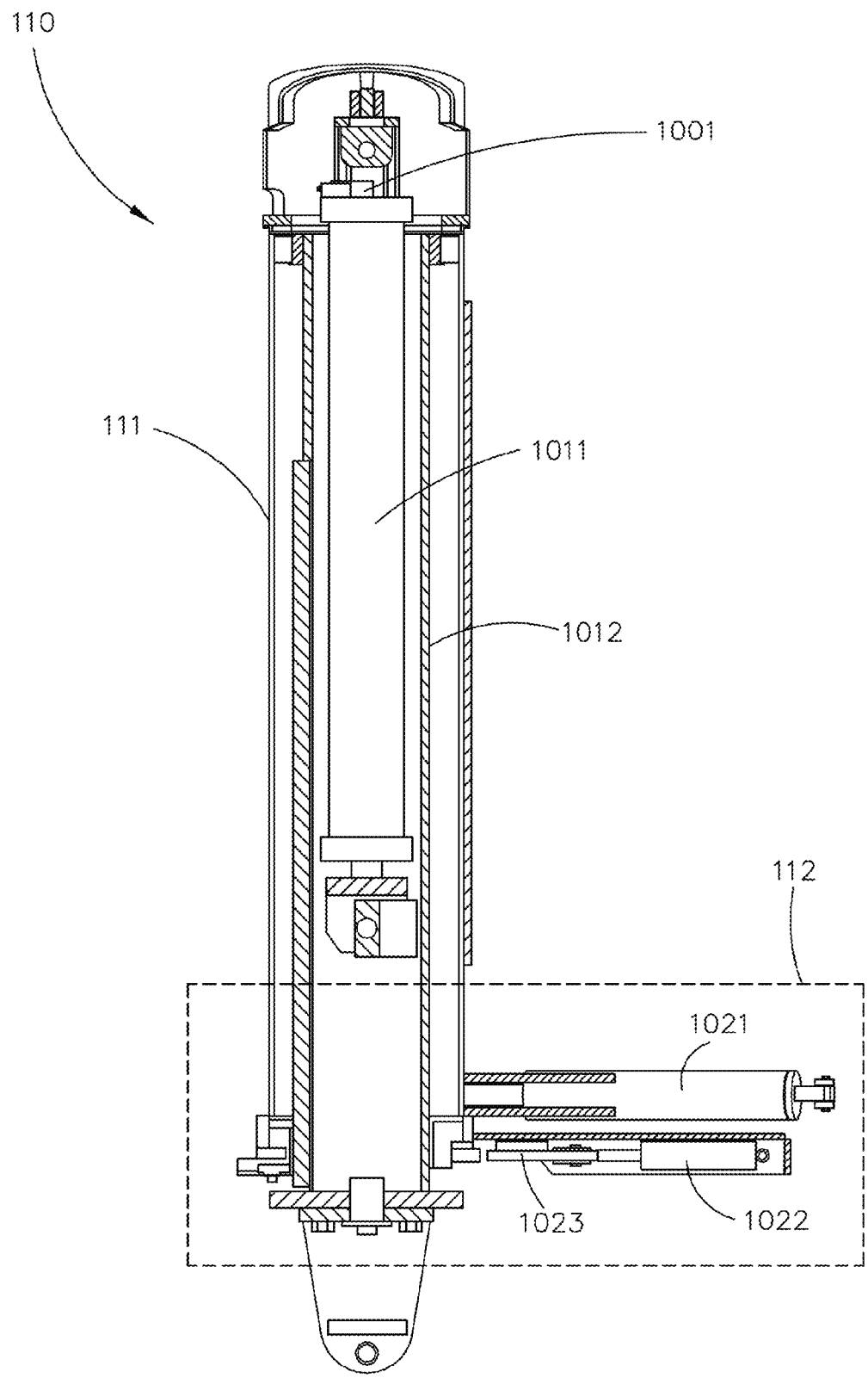
FIG. 10A shows a cross-sectional view of an exemplary leg assembly of some embodiments.

Referring now to FIGS. 9-10A, views of an exemplary leg assembly 110 of some embodiments are shown. In some embodiments, the leg assembly 110 includes an outer leg housing 111, a ratchet assembly 112, a drive mechanism 113 (e.g., a track), a leg rotational sensor 1001, a leg cylinder 1011, and a leg cylinder housing 1012. In some embodiments, a portion of the outer leg housing 111 is attached directly to the machine 101 or, for implementations which include a leg and shoulder assembly 810, to the arm 813 of the leg and shoulder assembly 810.

Figure 10B:
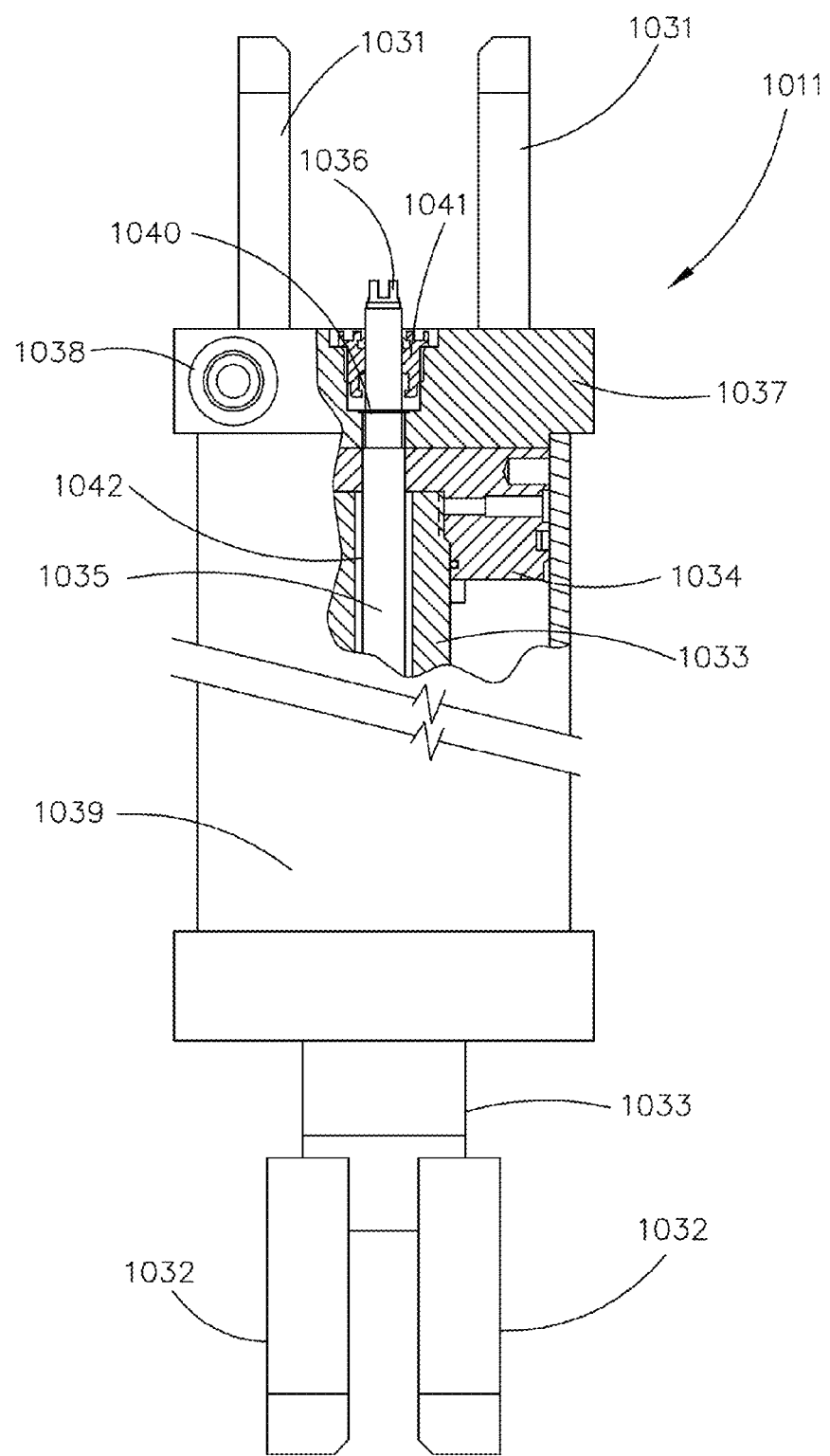
FIG. 10B shows a side partial cutaway view of the leg cylinder of some exemplary embodiments.

In some embodiments, the leg rotational sensor 1001 is configured to sense (e.g., measure, detect, or the like) a degree of rotation of the leg cylinder 1011. The leg rotational sensor 1001 may be configured to output or send data of the degree of rotation of the leg cylinder 1011 to one or more computing devices (e.g., 2201, or the like), one or more controllers (e.g., master controller 2203, leg controller 2204, or the like), or a combination thereof. In some embodiments, the leg rotational sensor 1001 is implemented within or attached to the leg cylinder 1011. For example, in exemplary implementations, the leg rotational sensor 1001 may be implemented within or attached to a top or bottom portion of the leg cylinder 1011; in other implementations, the leg rotational sensor 1001 may be located above or below the leg cylinder 1011 and within (e.g., beneath or within the enclosed side of) a leg cap (e.g., 1701) or leg shackle (e.g., 1702). In exemplary embodiments, the leg rotational sensor 1001 may sense an amount of rotation of a rotation position shaft (e.g., 1035, as shown in FIG. 10B) that rotates with a rod (e.g., 1033) of the leg cylinder 1011. In exemplary embodiments, the leg rotational sensor 1001 may comprise an inductive angle sensor (e.g., an analog inductive angle sensor or a digital inductive angle sensor); however, in other embodiments, the leg rotational sensor 1001 may comprise any suitable sensor configured to sense a degree of rotation of the leg cylinder 1011.

In some embodiments, a top end (e.g., a butt end 1031) of the leg cylinder 1011 is attached with a pin (e.g., 1704) to a leg shackle (e.g., 1702), and the bottom end (e.g., a rod end 1032) of the leg cylinder 1011 is attached with a pin (e.g., 1704) to an inside portion of the leg cylinder housing 1012. In some embodiments, the leg cylinder 1011 may comprise a powered cylinder configured to lift or lower the machine 101 in addition to allowing the drive mechanism 113 to rotate about a vertical axis of the leg cylinder 1011, and in such embodiments, the powered cylinder may comprise a hydraulically driven cylinder, an electrically powered cylinder, a pneumatically powered cylinder, or the like. In some embodiments, operation of the leg cylinder 1011 is controlled by a computing device (e.g., 2201, or the like), a controller (e.g., master controller 2203, leg controller 2204, or the like), or a combination thereof.

In some embodiments, the leg cylinder housing 1012 resides within the outer leg housing 111, and the leg cylinder housing 1012 houses the leg cylinder 1011. In some embodiments, the leg cylinder housing 1012 is configured to rotate within the outer leg housing 111 while the outer leg housing 111 is attached to the machine 101 or the arm 813 of the leg and shoulder joint assembly 810. In some embodiments, a bottom portion of the leg cylinder housing 1012 is attached to a steering collar 1103 of the ratchet assembly 112 (or another portion of the ratchet assembly) such that a rotation induced by extending or retracting the steer cylinder 1021 may be transferred to the drive mechanism 113 when a ratchet lock mechanism (which may include, for example, a ratchet lock bar 1023) is in a locked position and such that a rotation induced by extending or retracting the steer cylinder 1021 is not transferred to the drive mechanism 113 when a ratchet lock mechanism (which may include, for example, a ratchet lock bar 1023) is in an unlocked position; in such embodiments, a bottom portion of the ratchet assembly 112 may be attached to a pivot yoke (e.g., 1301), which is attached to the drive mechanism 113. In other embodiments, a portion of the leg cylinder housing 1012 lockably passes through ratchet assembly and a bottom portion of the leg cylinder housing 1012 is attached to a pivot yoke (e.g., 1301), which attaches to the drive mechanism 113, such that a rotation induced by extending or retracting the steer cylinder 1021 may be transferred to the drive mechanism 113 when a ratchet lock mechanism (which may include, for example, a ratchet lock bar 1023) is in a locked position and such that a rotation induced by extending or retracting the steer cylinder 1021 is not transferred to the drive mechanism 113 when a ratchet lock mechanism (which may include, for example, a ratchet lock bar 1023) is in an unlocked position.

Referring now to FIG. 10B, a side partial cutaway view of the leg cylinder 1011 of some exemplary embodiments is shown. In some embodiments, the leg cylinder 1011 includes a butt end 1031 (e.g., a top end), a rod end 1032 (e.g., a bottom end), a rod 1033, a piston 1034, a rotation position shaft 1035, a protruding end 1036 of the rotation position shaft 1035, a cylinder end 1037, hydraulic ports 1038, a cylinder barrel 1039, a retaining ring 1040, and a bearing 1041, as well as other components and/or features typically implemented with a hydraulic cylinder.

In exemplary embodiments, the rotation position shaft 1035 is configured to rotate with the rod end 1032, the rod 1033, and the piston 1034 while the cylinder barrel 1039, the cylinder end 1037, and the butt end 1031 remain rotationally stationary. The protruding end 1036 may be held in place by the retaining ring 1040 while allowing the rotation position shaft 1035 to freely rotate. The protruding end 1036 of the rotation position shaft 1035 may pass through the cylinder end 1037, the retaining ring 1040, and the bearing 1041. The protruding end 1036 portion of the rotation position shaft 1035 that passes through the cylinder end 1037 may have a circular cross-section so as to freely rotate with respect to the rotationally stationary cylinder end 1037. From the protruding end 1036 portion, the rotation position shaft 1035 may extend through a central interior portion of the leg cylinder 1011. For example, in some embodiments, a portion of the rotation position shaft 1035 may pass through the piston 1034 and a central interior portion of the rod 1033 via a sleeve 1042. In some embodiments, the sleeve 1042, which also passes through the piston 1034 and extends through a central interior portion of the rod 1033, is configured to slide tightly but freely around the rotation position shaft 1035 such that no significant tensile or compressive forces are exerted on the rotation position shaft 1035 during extension or retraction of the rod 1033. The portion of the rotation position shaft 1035, which extends through the sleeve 1042, may have a non-circular cross-section (e.g., a square or triangular cross-section, or the like) corresponding to a non-circular cross-section of the sleeve 1042 such that a rotation of the rod end 1032, the rod 1033, and the piston 1034 induces a rotation in the rotation position shaft 1035. In some embodiments, a terminal portion (not shown) of the rotation position shaft 1035 may reside unattached in the sleeve 1042 and may remain within the sleeve 1042 even during a maximum or minimum amount of extension of the rod 1033.

In some embodiments, the leg cylinder 1011 is configured to extend causing the machine 101 to lift or to retract causing the machine 101 to lower. For example, a lift operation may be performed by supplying hydraulic oil through an extend port (e.g., a first particular port 1038) which forces a piston 1034 to extend the rod 1033 and lengthen the leg cylinder 1011. Likewise, a lowering operation may be performed by removing hydraulic oil out of and through a retract port (e.g., a second particular port 1038) causing the piston 1034 to retract the rod 1033 and shorten the leg cylinder 1011. In some embodiments, as the leg cylinder 1011 is being stroked in or out, a sleeve 1042, which passes through the piston 1034 and extends through a central interior portion of the rod 1033, slides tightly but freely around the rotation position shaft 1035 such that no significant tensile or compressive forces are exerted on the rotation position shaft 1035 during extension or retraction of the rod 1033. Additionally, the rod end 1032, the rod 1033, the piston 1034 and the rotation position shaft 1035 may be rotated at the same time that the leg cylinder 1011 is being stroked in or out. Further, an amount of rotation of the rod end 1032, the rod 1033, and the piston 1034 induces a corresponding same amount of rotation in the rotation position shaft 1035.

In some embodiments, when a drive mechanism 113 that is rotatably coupled to the rod end 1032 is rotated, the rotation position shaft 1035 is rotated by a same amount. For example, if a ratchet lock mechanism is in a locked position and the drive mechanism 113 is being rotated, the rod end 1032, the rod 1033, the rotation position shaft 1035, and the protruding end 1036 of the rotation position shaft 1035 will also rotate in unison with the drive mechanism 113 while the cylinder barrel 1039, the cylinder end 1037, and the butt end 1031 remain rotationally stationary. Because the protruding end 1036 of the rotation position shaft 1035 may rotate by a same amount as the rod end 1032 (which also rotates the same amount as the drive mechanism 113), the leg rotational sensor 1001 may accurately measure the amount of rotation of the rod 1033 (and likewise the drive mechanism 113) of the leg cylinder 1011 by measuring the rotation of the protruding end 1036 of the rotation position shaft 1035.

Figure 10C:
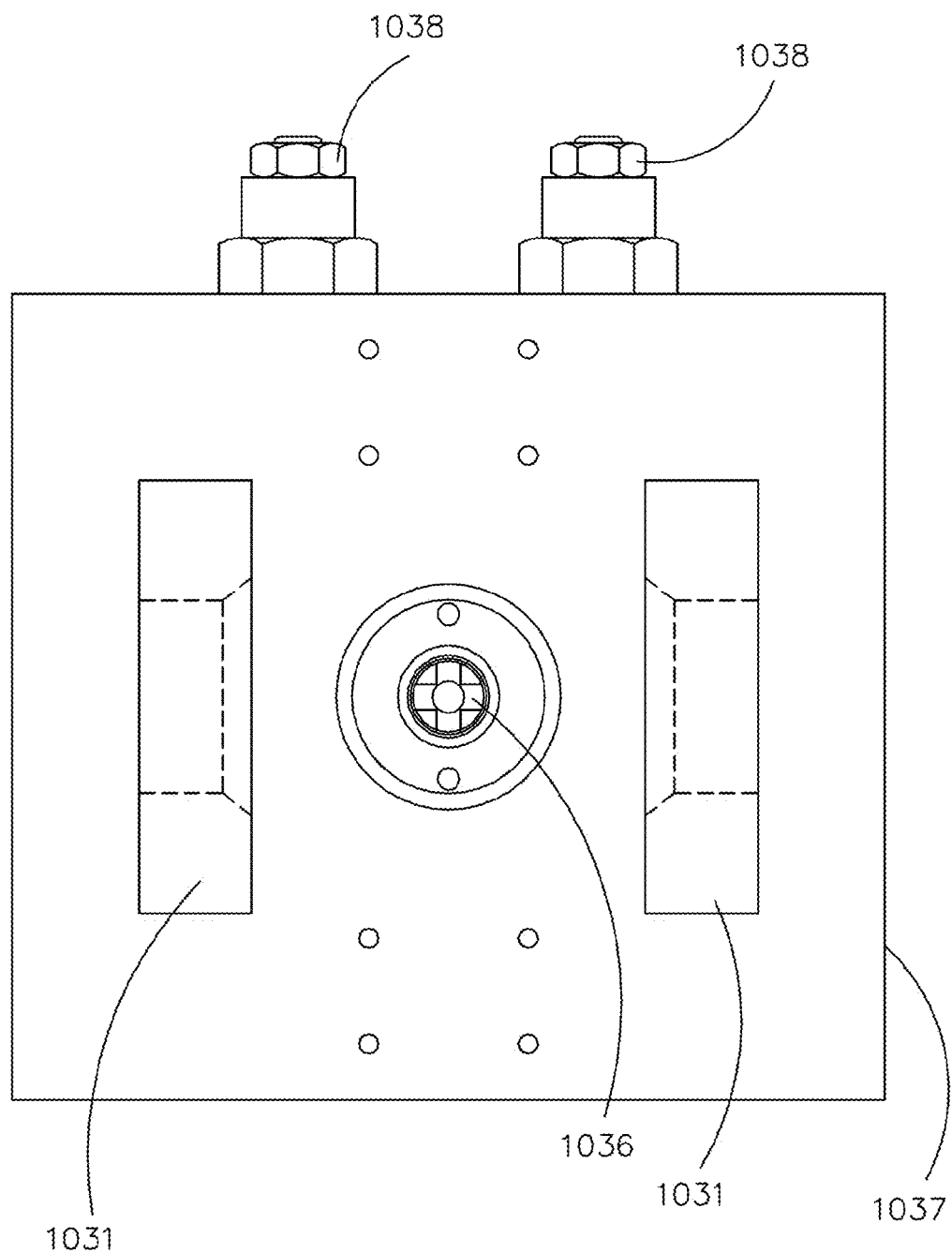
FIG. 10C shows a top view of the leg cylinder of some embodiments.

Referring now to FIG. 10C, a top view of the leg cylinder 1011 of some embodiments is shown. In exemplary embodiments, the protruding end 1036 of the rotation position shaft 1035 extends through the cylinder end 1037 such that a portion of the protruding end 1036 is exposed. In some embodiments, a tip of the protruding end 1036 may be shaped to register with the leg rotational sensor 1001, which may be mounted on the cylinder end 1037, such that the leg rotational sensor 1001 may accurately sense an amount of rotation of the rotation position shaft 1035 (and likewise, the components configured to rotate in unison with the rotation position shaft 1035) as the protruding end 1036 rotates. In a particular exemplary embodiment, the tip of the protruding end 1036 may include a cross-shaped slot configured to register with a corresponding portion of the leg rotational sensor 1001.

Figure 10D:
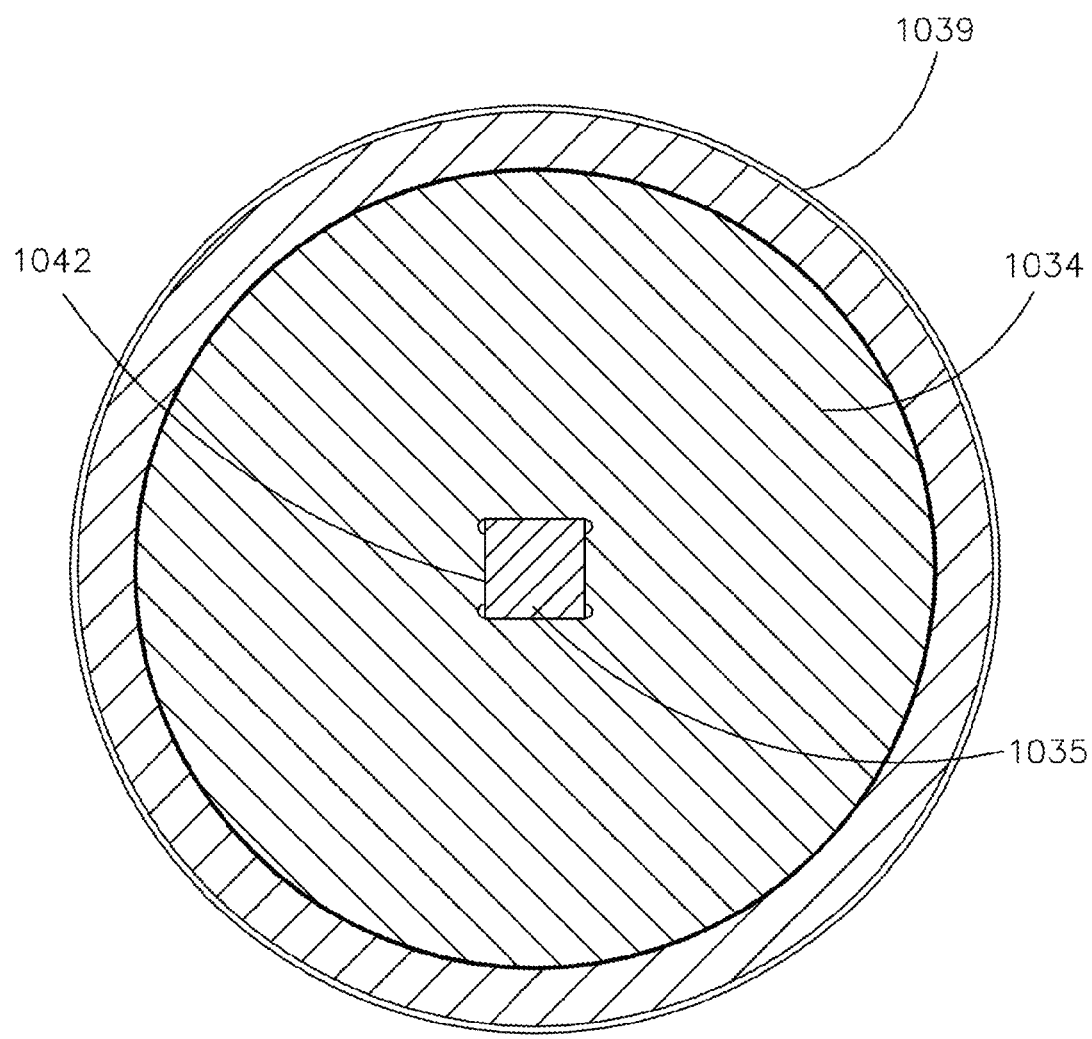
FIG. 10D shows a cross-sectional view of the rotation position shaft, the piston, the sleeve, and the cylinder barrel of some embodiments.

Referring now to FIG. 10D, a cross-sectional view of the rotation position shaft 1035, the piston 1034, the sleeve 1042, and the cylinder barrel 1039 of some embodiments is shown. FIG. 10D exemplarily demonstrates how the rotation position shaft 1035 passes through the piston 1034 via the sleeve 1042.

While the cylinder described and shown with respect to FIGS. 10B-D is exemplarily shown as a leg cylinder 1011 of a leg assembly 110, in other embodiments the features described and shown with respect to the leg cylinder 1011 may be applied to and/or implemented as any of various cylinders suitable for use in other applications or equipment.

Figure 10E:
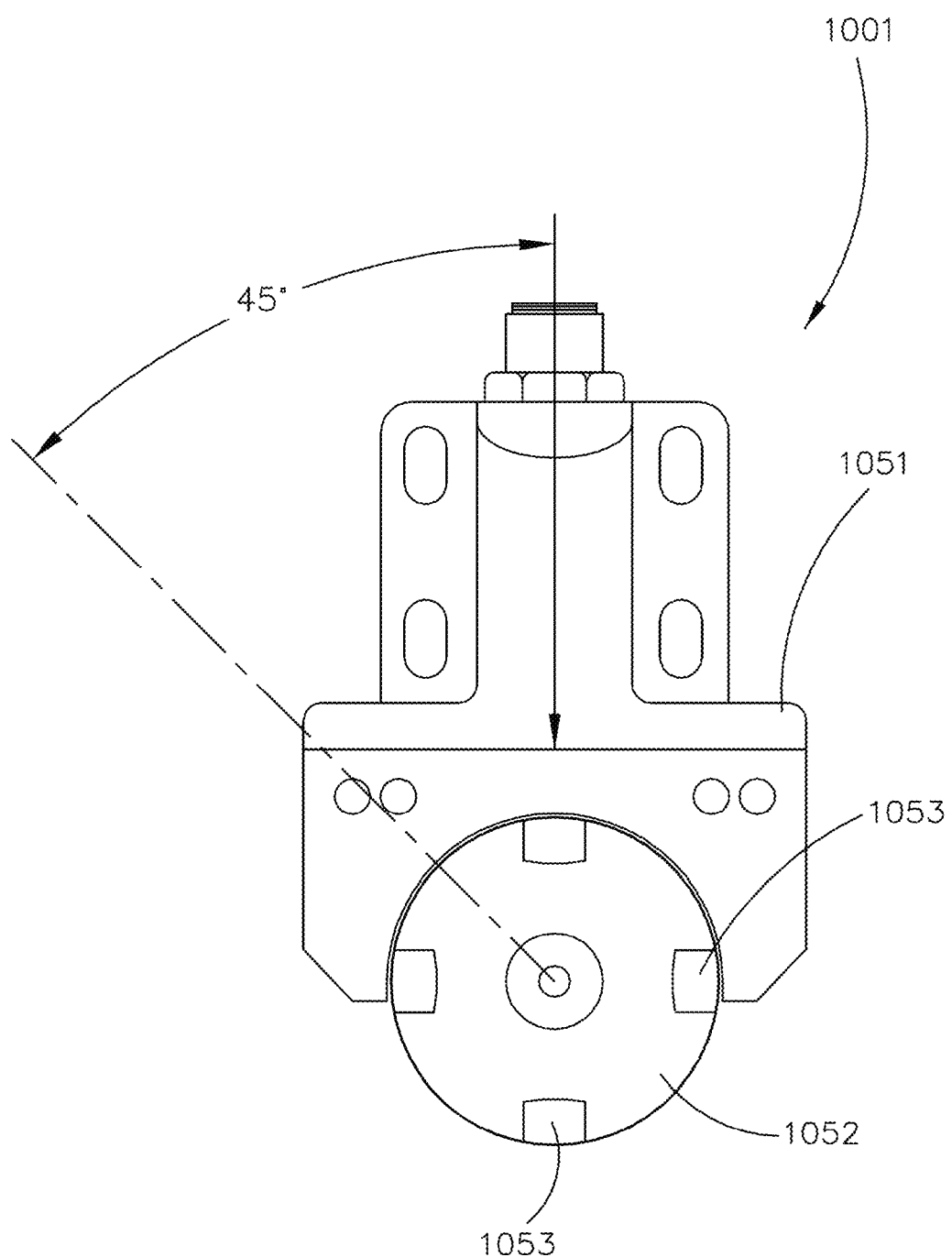
FIG. 10E shows a view of a leg rotational sensor of some exemplary embodiments.

Referring now to FIG. 10E, a view of a leg rotational sensor 1001 of some exemplary embodiments is shown. In some embodiments, the leg rotational sensor 1001 may include a main sensor body portion 1051 and a rotary sensor portion 1052. In some embodiments, the leg rotational sensor 1001 is configured to mount on the cylinder end 1037 of the leg cylinder 1011 such that the leg rotational sensor 1001 measures an amount of rotation of the protruding end 1036 of the rotation position shaft 1035. The rotary sensor portion 1052 may be configured to rotate in unison with the protruding end 1036. The rotary sensor portion 1052 may include registration portions 1053 that register with the protruding end 1036; in a particular exemplary embodiment, the registration portions 1053 comprise four bars radially spaced about the rotary sensor portion 1052 by 90 degrees such that the four bars register with a cross-shaped slot on the tip of the protruding end 1036. The leg rotational sensor 1001 may be configured to accurately measure amounts of rotation of the protruding end 1036 of the rotation position shaft 1035 (as well as components rotating in unison with the protruding end 1036, such as the drive mechanism 113) as described above.

Figure 11:
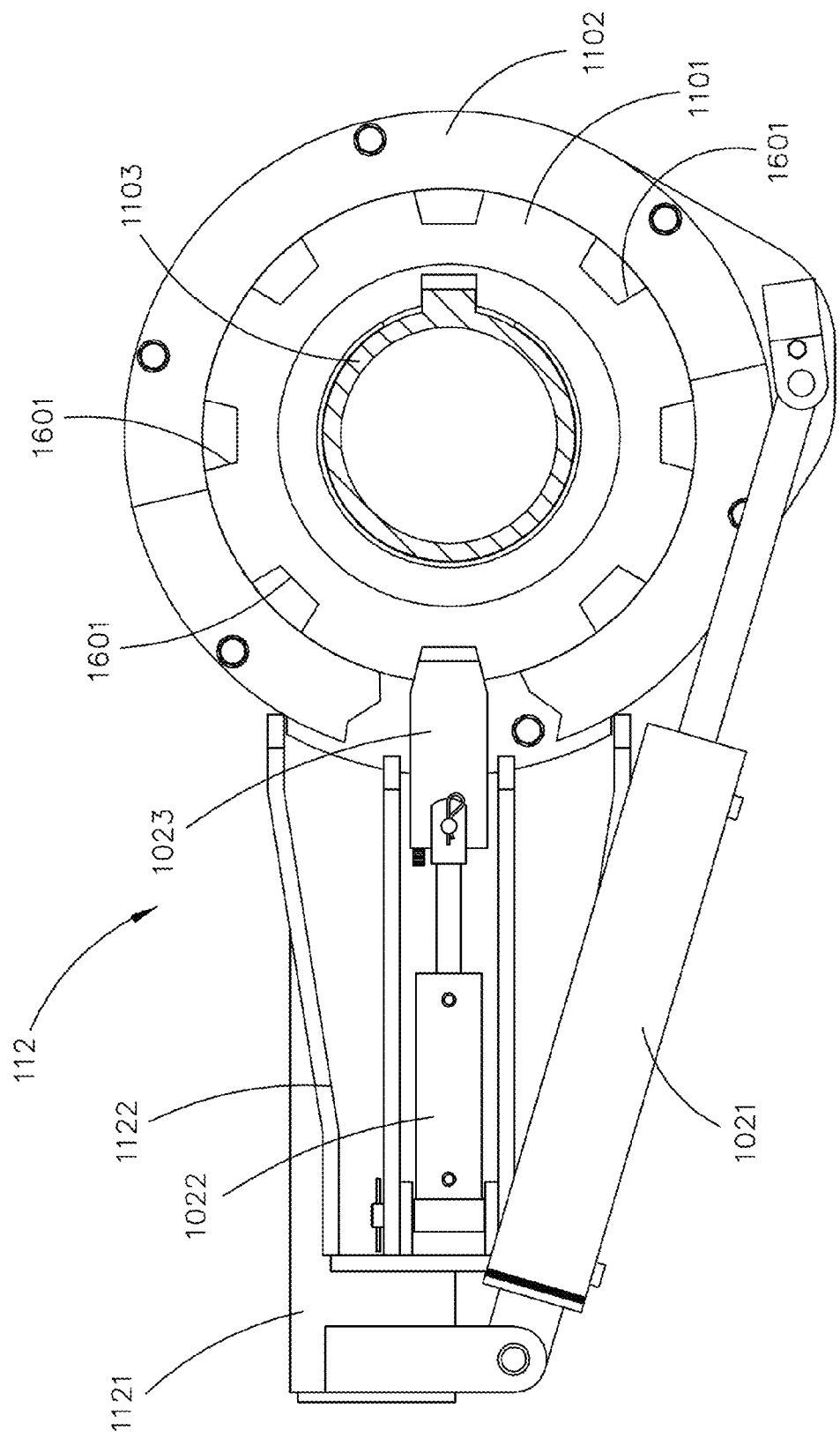
FIG. 11 shows a view of an exemplary ratchet assembly of some embodiments.

Referring now to FIG. 11, a view of an exemplary ratchet assembly 112 of some embodiments is shown. In some embodiments, the ratchet assembly 112 may include a ratchet lock mechanism (which may, for example, include a ratchet lock bar 1023, a ratchet cylinder 1022, and a ratchet lock gear 1101), a steer cylinder 1021, a steer cylinder bracket arm 1121, a steer ring 1102, a steer ring side structure 1122, and a steering collar 1103.

In exemplary embodiments, the ratchet lock mechanism may comprise a ratchet lock bar 1023, a ratchet cylinder 1022, and a ratchet lock gear 1101. As exemplarily shown in FIG. 11, the ratchet lock mechanism of the ratchet assembly 112 is in a locked position; that is, the ratchet lock bar 1023 is engaged with (e.g., inserted into) a particular ratchet lock bar slot 1601 of the ratchet lock gear 1101 such that when the steer cylinder 1021 is extended or retracted, the steer ring 1102, the ratchet lock gear 1101, and the steering collar 1103 all rotate (e.g., relative to the stationary outer leg housing 111).

In some embodiments, a first end of the steer cylinder bracket arm 1121 is attached to the outer leg housing 111, and a second end of the steer cylinder bracket arm 1121 is attached to the steer cylinder 1021.

In some embodiments, a first end of the steer cylinder 1021 is attached to the steer cylinder bracket arm 1121, and a second end of the steer cylinder 1021 is attached to an attachment point of the steer ring 1102. In some embodiments, the steer cylinder 1021 may comprise a powered cylinder configured to extend and retract, and in such embodiments, the powered cylinder may comprise a hydraulically driven cylinder, an electrically powered cylinder, a pneumatically powered cylinder, or the like. Extending or retracting the steer cylinder 1021 causes the steer ring 1102 to rotate relative to the stationary outer leg housing 111. In some embodiments, operation of the steer cylinder 1021 is controlled by a computing device (e.g., 2201, or the like), a controller (e.g., master controller 2203, leg controller 2204, or the like), or a combination thereof.

In some embodiments, the steer ring 1102 is configured to be rotated by the extension or retraction of the steer cylinder 1021. In some embodiments, the steer ring 1102 surrounds (e.g., encircles) the ratchet lock gear 1101. The steer ring 1102 may be configured to rotate freely around the ratchet lock gear 1101 when the ratchet lock mechanism is in an unlocked position, and the steer ring may be configured to cause the ratchet lock gear 1101 to also rotate when the ratchet lock mechanism is in a locked position.

In some embodiments, the ratchet lock gear 1101 comprises a disk having a plurality (e.g., two, three (as exemplarily shown in FIGS. 12-16), four, . . . , 8 (as exemplarily shown in FIG. 11), or more) of ratchet lock bar slots 1601 and a center aperture configured to attach to the steering collar 1103. In some embodiments, each of the plurality of ratchet lock bar slots 1601 are arranged circumferentially and in an equally spaced fashion around the edges of the ratchet lock gear 1101; in other embodiments, for example as shown and described with respect to FIG. 16 (below), the plurality of ratchet lock bar slots 1601 may be arranged around only a circumferential portion of the ratchet lock gear 1101. In some embodiments, each of the plurality of ratchet lock bar slots 1601 may be uniformly sized and shaped so as to tightly engage, yet freely disengage with the ratchet lock bar 1023. In exemplary embodiments, each of the plurality of ratchet lock bar slots 1601 may be substantially trapezoid-shaped recesses in the ratchet lock gear 1101 such that corresponding engaging portions of the ratchet lock bar 1023 engage the side surfaces of a ratchet lock bar slot 1601 simultaneously so as to reduce friction during engagement or disengagement of the ratchet lock bar 1023 with the ratchet lock bar slot 1601.

In some embodiments, the steer ring side structure 1122 is attached to the steer ring 1102. The steer ring side structure 1122 is configured to house or partially house the ratchet cylinder 1022 and the ratchet lock bar 1023. In some embodiments, the steer ring side structure 1122 tapers from wider to narrower from an end attached to steer ring 1102 to an end attached to the ratchet cylinder 1022.

In some embodiments, a first end of the ratchet cylinder 1022 is attached to the steer ring side structure 1122, and a second end of the ratchet cylinder 1022 is attached to the ratchet lock bar 1023. In some embodiments, the ratchet cylinder 1022 may comprise a powered cylinder configured to extend and retract, and in such embodiments, the powered cylinder may comprise a hydraulically driven cylinder, an electrically powered cylinder, a pneumatically powered cylinder, or the like. Extending or retracting the ratchet cylinder 1022 causes the ratchet lock bar 1023 to engage or disengage with a particular ratchet lock bar slot 1601. In some embodiments, operation of the ratchet cylinder 1022 is controlled by a computing device (e.g., 2201, or the like), a controller (e.g., master controller 2203, leg controller 2204, or the like), or a combination thereof.

In some embodiments, the ratchet lock bar 1023 may have a tip configured to tightly register with a ratchet lock bar slot 1601. In exemplary embodiments, the ratchet lock bar 1023 may have a tapered tip configured to register with substantially trapezoid-shaped ratchet lock bar slots 1601. In a particular exemplary embodiment, the narrowest width portion of the tapered tip of the ratchet lock bar 1023 may be approximately 2.383 inches (e.g., 2.383 inches+/−0.005 inches), and the widest width portion of the ratchet lock bar 1023 may be approximately 3.00 inches (e.g., 3.00 inches+/−0.005 inches). In a particular exemplary embodiments the tapered tip of the ratchet lock bar 1023 may taper at angle of approximately 10 degrees (e.g., 10.0 degrees+/−1 degree) on each side of the tapered tip; that is, for example, the tapered tip portion of the ratchet lock bar 1023 may have a length of approximately 1.75 inches (e.g., 1.75 inches+/−0.005 inches) as the tapered tip portion tapers from approximately 3.0 inches to approximately 2.383 inches. While particular exemplary dimensions of the ratchet lock bar 1023 have been described for a particular exemplary embodiment, it is fully contemplated that the ratchet lock bar 1023 may have any of various other suitable dimensions in other embodiments.

In some embodiments, at least one sensor 2205 is implemented within, attached to, or implemented within proximity to the steer cylinder 1021 or another portion of the ratchet lock mechanism (e.g., the ratchet cylinder 1022, the ratchet lock bar 1023, or the ratchet lock gear 1101). In some embodiments, the at least one sensor 2205 is configured to sense (e.g., measure, detect, or the like) whether the ratchet lock bar 1023 is aligned with a particular ratchet lock bar slot 1601. In exemplary embodiments, when the ratchet lock mechanism is in an unlocked position, a single sensor 2205 senses a distance (e.g., a circumferential distance) of how far the ratchet lock bar 1023 has traveled around the ratchet lock gear 1101; in other exemplary embodiments, when the ratchet lock mechanism is in an unlocked position, a single sensor 2205 senses a degree of rotation traveled around the ratchet lock gear 1101; in still other exemplary embodiments, a plurality of sensors are implemented throughout the ratchet lock mechanism such that each of the plurality of ratchet lock bar slots 1601 has an associated sensor configured to sense when the ratchet lock bar 1023 is aligned with a particular ratchet lock bar slot 1601. Further, in some embodiments, the at least one sensor 2205 may be configured to output or send data associated with the alignment or non-alignment of the ratchet lock bar 1023 relative to the plurality of ratchet lock bar slots 1601 to one or more computing devices (e.g., 2201, or the like), one or more controllers (e.g., master controller 2203, leg controller 2204, or the like), or a combination thereof. In some embodiments, the at least one sensor 2205 is implemented within or attached to a portion(s) of the ratchet lock mechanism (e.g., steer cylinder 1021, ratchet lock bar 1023, ratchet cylinder 1022, and/or ratchet lock gear 1101). In exemplary embodiments, the at least one sensor 2205 may comprise an inductive linear sensor (e.g., an analog inductive linear sensor or a digital inductive linear sensor); however, in other embodiments, the at least one sensor 2205 may comprise any suitable sensor configured to sense whether the ratchet lock bar 1023 is aligned with a particular ratchet lock bar slot 1601.

Referring still to FIG. 11, in some embodiments, a top portion of the steering collar 1103 is attached to the leg cylinder housing 1012, and a bottom portion of the steering collar 1103 is attached to the ratchet lock gear 1101. As such, when the steering collar 1103 (and likewise, the ratchet lock gear 1101 to which the steering collar 1103 is attached) is rotated (e.g., in response to the steer cylinder 1012 being extended or retracted when the ratchet lock mechanism is in a locked position), the drive mechanism 113 and the leg cylinder housing 1012 also rotate (e.g., rotate in unison relative to the stationary outer leg housing 111).

In some embodiments, when the ratchet lock mechanism is in a locked position and when the steer cylinder is being extended or retracted, the drive mechanism 113, the ratchet lock gear 1101, the steering collar 1103, the steer ring 1102, and the leg cylinder housing 1012 all rotate (e.g., rotate in unison relative to the stationary outer leg housing 111). In some embodiments, when the ratchet lock mechanism is in an unlocked position and when the steer cylinder is being extended or retracted, the steer ring 1102 rotates freely around the ratchet lock gear 1101 without imparting any significant torque on the ratchet lock gear 1101, the drive mechanism 113, the steering collar 1103, the steer ring 1102, and the leg cylinder housing 1012.

Figure 12:
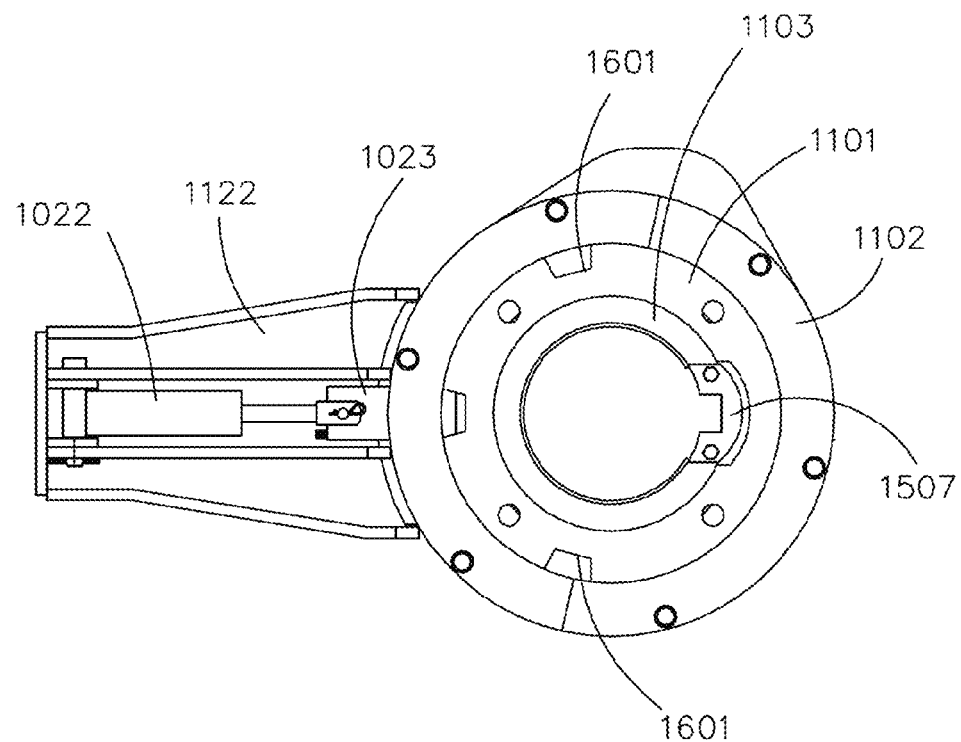
FIG. 12 shows a bottom view of a portion of an exemplary ratchet assembly.

Referring now to FIG. 12, a bottom view of a portion of an exemplary ratchet assembly 112 of some embodiments is shown. In some embodiments, a lower retainer 1507 may be attached to the bottom of the steering collar 1103 to secure the steering collar 1103 to the ratchet lock gear 1101. In some embodiments, the lower retainer 1507 may fit securely within a corresponding lower retainer recess (e.g., 1603) of the bottom of the ratchet lock gear 1101.

Figure 13:
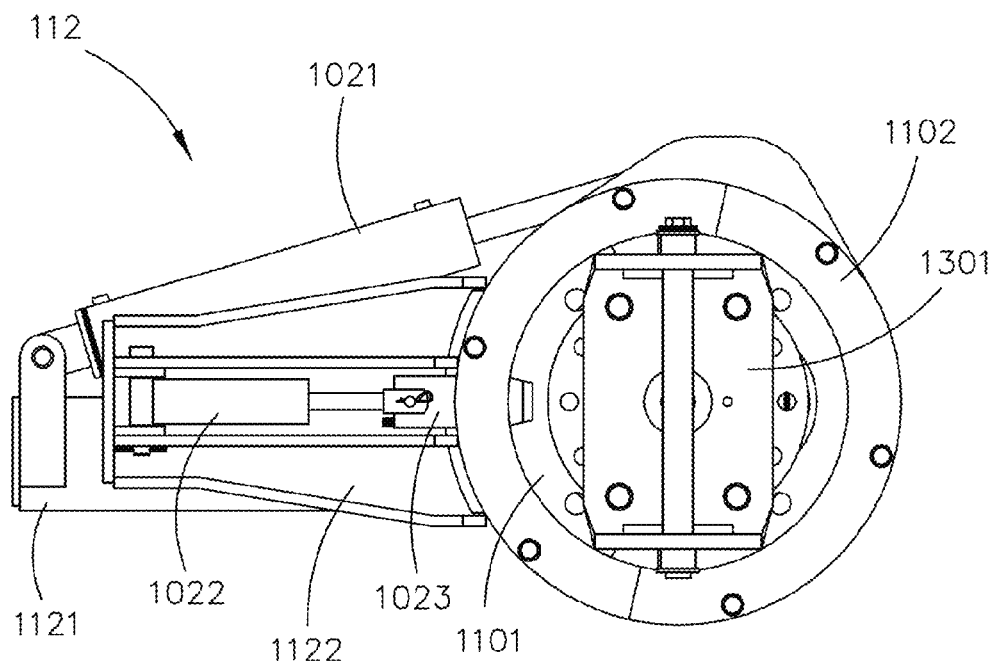
FIG. 13 shows a bottom view of an exemplary ratchet assembly attached to a pivot yoke of some embodiments.

Referring now to FIG. 13, a bottom view of an exemplary ratchet assembly 112 attached to a pivot yoke 1301 of some embodiments is shown. In some embodiments, the pivot yoke 1301 is attached to a bottom portion of the ratchet assembly (e.g., the ratchet lock gear 1101, the steering collar 1103, or the like) such that pivot yoke 1301 rotates in unison with the ratchet lock gear 1101. The pivot yoke may be to be attached to a drive mechanism 113 such that when ratchet lock gear 1101 and the pivot yoke 1301 are rotated, the drive mechanism 113 also rotates.

Figure 14:
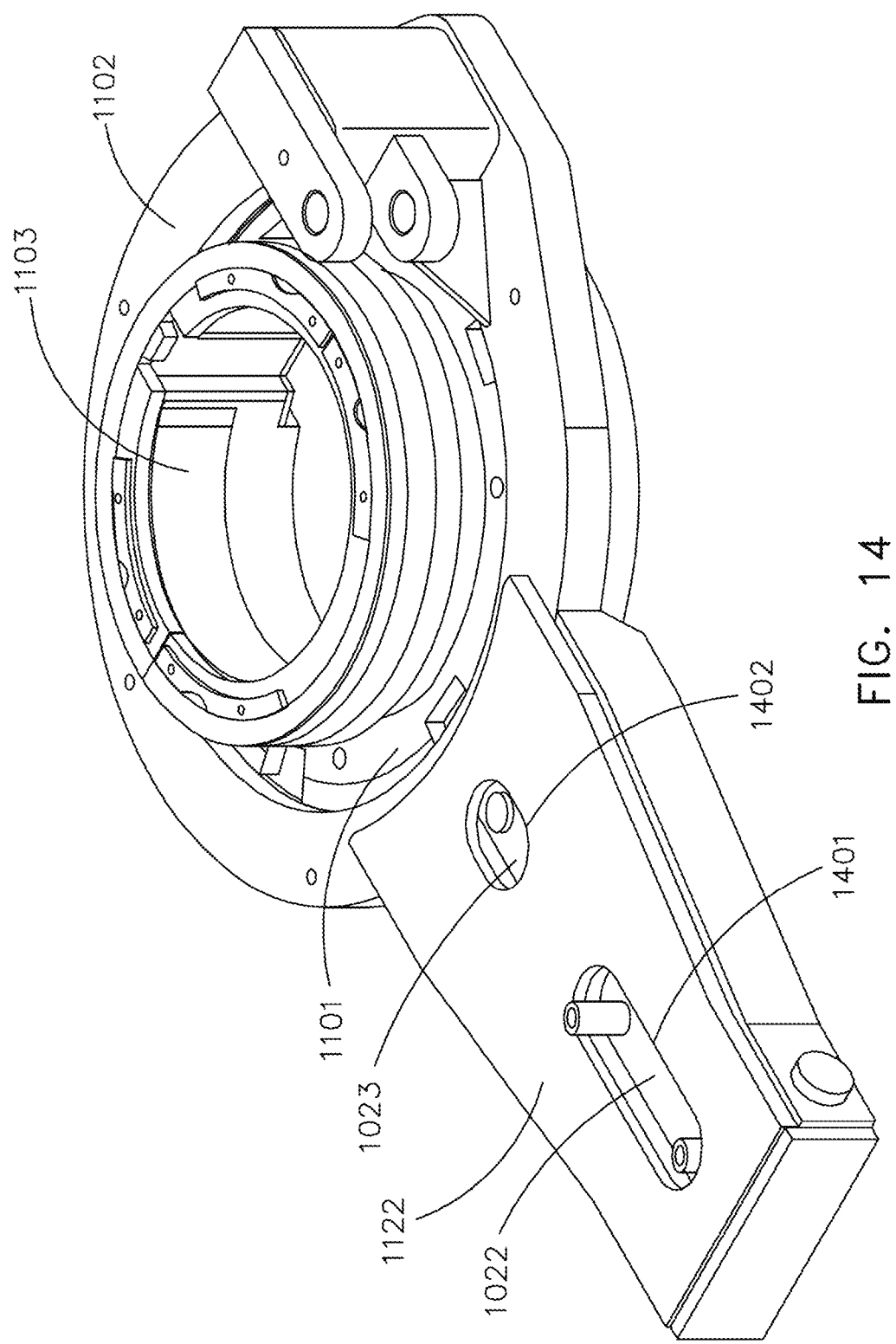
FIG. 14 shows an isometric view of a portion of an exemplary ratchet assembly of some embodiments.

Referring now to FIG. 14, an isometric view of a portion of an exemplary ratchet assembly 112 of some embodiments is shown. In some embodiments, the steer ring side structure 1122 includes a ratchet cylinder access 1401 and ratchet lock bar access 1402. For example, the ratchet cylinder access 1401 may be configured to provide access to the ratchet cylinder 1022 such that lines (e.g., hydraulic lines, electrical lines, pneumatic lines, control system wires, or the like) can be coupled to the ratchet cylinder 1022; additionally, the ratchet cylinder access 1401 may provide access for maintenance or cleaning purposes. Similarly, the ratchet lock bar access 1402 may be configured to provide access to the ratchet lock bar 1023 such that lines (e.g., hydraulic lines, electrical lines, pneumatic lines, control system wires, or the like) can be coupled to the ratchet lock bar 1023; additionally, the ratchet lock bar access 1401 may provide access for maintenance or cleaning purposes.

Figure 15:
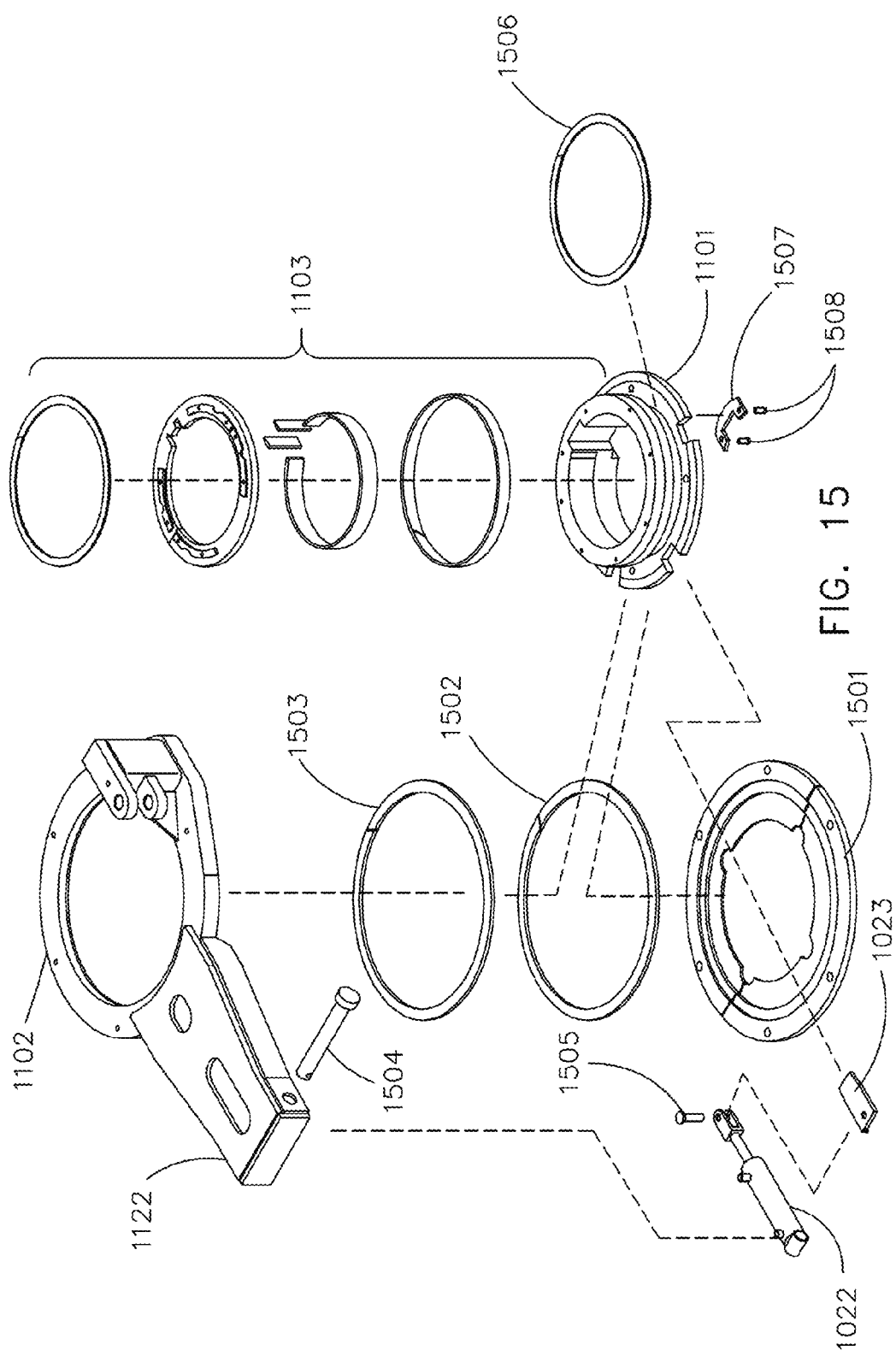
FIG. 15 shows an exploded view of a portion of the ratchet assembly of some embodiments.

Referring now to FIG. 15, an exploded view of a portion of the ratchet assembly 112 of some embodiments is shown. As exemplarily shown in FIG. 15, components of the steering collar 1103 are secured to the ratchet lock gear 1101 by an attachment means 1508 (e.g., bolts, pins, or the like) and a lower retainer 1507. The steering collar 1103 and the ratchet lock gear 1101 may rotatably fit between the steer ring 1102 and a lower steer ring retainer 1501. The steer ring 1102 may be secured to the lower steer ring retainer 1501 by attachment means, and the steering collar 1103 and the ratchet lock gear 1101 may be configured to freely rotate when contained by the steer ring 1102 and the lower steer ring retainer 1501. In some embodiments, the lower steer ring retainer 1501 may comprise two halves, which may be connected (e.g., tied) to each other during the assembly process. One or more bearings (e.g., 1502, 1503, 1506) may be inserted between abutting portions of the steer ring 1102, the lower steer ring retainer 1501, the steering collar 1103, and the ratchet lock gear 1101 to minimize friction between moving components. In some embodiments, the one or more bearings may comprise nylon bearings; however, it is fully contemplated that the one or more bearings may comprise any suitable material for reducing friction between moving components. The steer ring 1102 may be attached to a steer ring side structure 1122. An end of the ratchet cylinder 1022 may be attached to the steer ring side structure 1122 by attachment means 1504 (e.g., a pin or the like). The ratchet lock bar 1023 may be attached to the other end of the ratchet cylinder 1022 by attachment means 1505 (e.g., a pin or the like).

Figure 16:
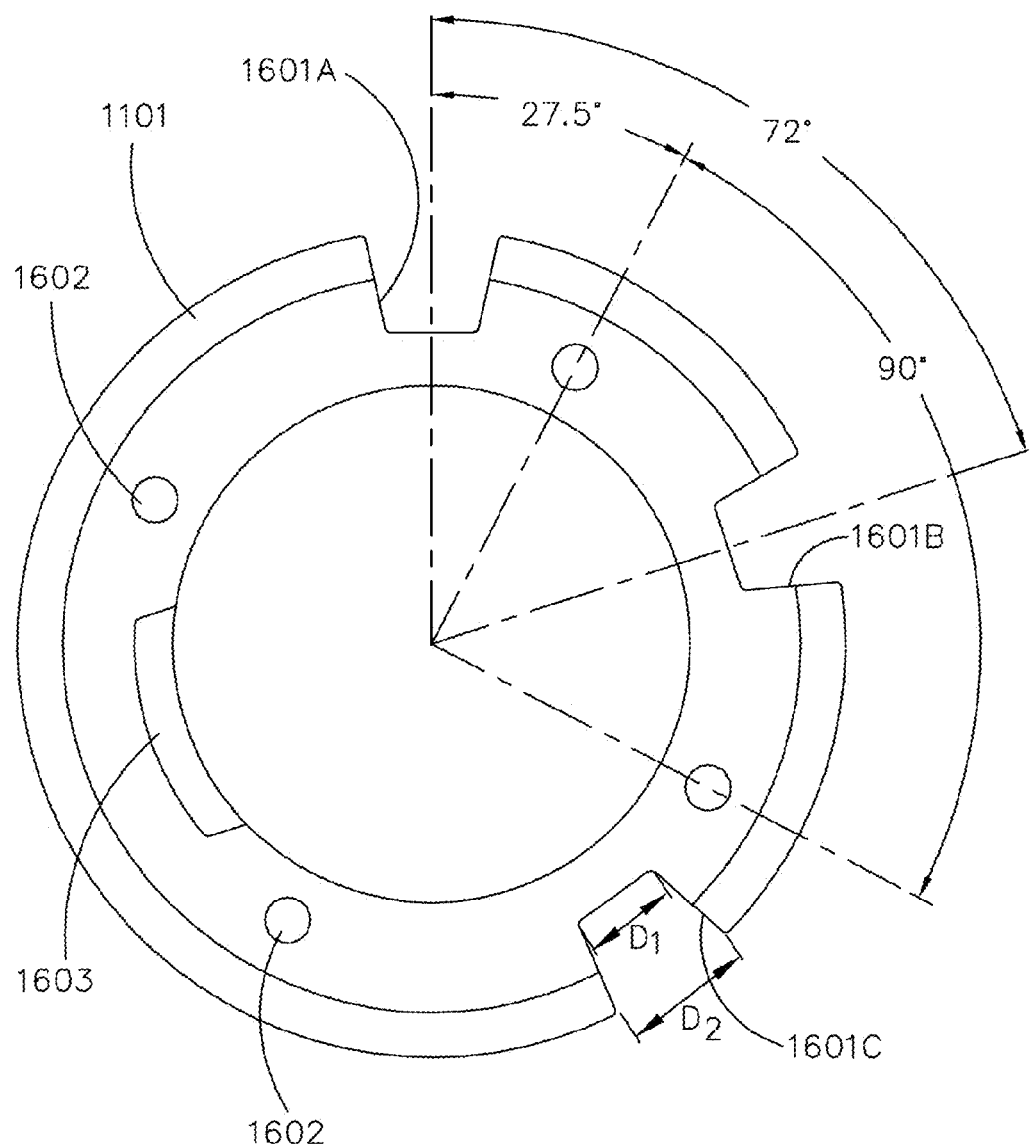
FIG. 16 shows a view of an exemplary ratchet lock gear of a particular exemplary embodiment.

Referring now to FIG. 16, a view of an exemplary ratchet lock gear 1101 of a particular exemplary embodiment is shown. As shown, the ratchet lock gear 1101 may comprise a disk having three ratchet lock bar slots 1601 (i.e., 1601A, 1601B, and 1601C), a center aperture configured to accommodate the steering collar 1103, one or more holes 1602 configured for attachment purposes, and a lower retainer recess 1603 configured to attach to the lower retainer 1507. In some embodiments, each of the three ratchet lock bar slots 1601 (i.e., 1601A, 1601B, and 1601C) may be radially spaced 72 degrees apart around a circumferential portion of the ratchet lock gear 1101. While each of the ratchet lock bar slots 1601 (i.e., 1601A, 1601B, and 1601C) may be radially spaced 72 degrees apart in some embodiments, it is fully contemplated that in other embodiments the each of the three ratchet lock bar slots 1601 (i.e., 1601A, 1601B, and 1601C) may be radially spaced any suitable number of degrees apart. As shown in FIG. 16, each of the ratchet lock bar slots 1601 (i.e., 1601A, 1601B, and 1601C) may be uniformly sized and shaped so as to tightly engage, yet freely disengage with the ratchet lock bar 1023. For example, each of the plurality of ratchet lock bar slots 1601 (i.e., 1601A, 1601B, and 1601C) may be substantially trapezoid-shaped recesses in the ratchet lock gear 1101 such that corresponding engaging portions of the ratchet lock bar 1023 engage the side surfaces of a ratchet lock bar slot 1601 (e.g., 1601A, 1601B, or 1601C) simultaneously so as to reduce friction during engagement or disengagement of the ratchet lock bar 1023 with the ratchet lock bar slot 1601 (e.g., 1601A, 1601B, or 1601C). In some embodiments, an inner distance, D1, between two side walls of each ratchet lock bar slot 1601 (e.g., 1601A, 1601B, or 1601C) may be less than an outer distance, D2, between the two side walls of each ratchet lock bar slot 1601; for example, in a particular exemplary embodiment, D1 may be a distance of approximately 2.25 inches (e.g., 2.247 inches+/−0.005 inches), D2 may be a distance of approximately 3.0 inches (e.g., 2.997 inches+/−0.005 inches). Additionally, in a particular exemplary embodiment, each of the side walls of the ratchet lock bar slots 1601 (i.e., 1601A, 1601B, and 1601C) may be angled at approximately 10 degrees (e.g., 10 degrees+/−1 degree) so as to register with correspondingly angled sides of a tapered tip portion of the ratchet lock bar 1023. While particular exemplary dimensions of the ratchet lock gear 1101 have been described for a particular exemplary embodiment, it is fully contemplated that the ratchet lock gear 1101 have any of various other suitable arrangements and any of various other suitable dimensions in other embodiments.

Still referring to FIG. 16, engagement of the ratchet lock bar 1023 with a particular ratchet bar slot 1601 (e.g., 1601A, 1601B, or 1601C) may correspond to operating the leg assembly 110 in a particular operational mode. For example, when the ratchet lock bar 1023 is engaged with a center ratchet bar slot 1601B, leg assembly 110 of the machine 101 may be configured to operate in a standard operational mode (e.g., a pave mode), whereby the direction of travel of the machine 101 may be generally configured to correspond to a direction of a paving project; for example, when operating in the standard operational mode (e.g., when the ratchet lock bar 1023 is engaged with a center ratchet bar slot 1601B), the drive mechanism 113 of the leg assembly 110 may be configured to drive in a pave direction, and the drive mechanism 113 may be configured to be rotated by the steer cylinder 1021 within a particular angular range of motion (e.g., for a particular exemplary embodiment, up to 72 degrees in either the counter-clockwise or clockwise direction, or the like). If the drive mechanism 113 of the leg assembly 110 needs to be rotated more than the particular range of motion, the ratchet lock bar 1023 may be disengaged from the center ratchet lock bar slot 1601B, and the steer ring cylinder 1102 may be rotated (e.g., by extending or retracting the steer cylinder 1021) around the ratchet lock gear 1101 so as to align the ratchet lock bar 1023 with a different ratchet lock bar slot (e.g., 1601A or 1601B) associated with a transport mode. The ratchet lock bar 1023 may then be engaged (e.g., locked) with the different ratchet lock bar slot (e.g., 1601A or 1601B) so that the leg assembly 110 may operate in the transport mode, which allows the drive mechanism to rotate in a further particular range of motion (e.g., for a particular exemplary embodiment, up to 72 additional degrees in either the counter-clockwise or clockwise further than the particular range of motion associated with the standard operational mode, or the like). In the exemplary embodiment depicted in FIG. 16, the three ratchet lock bar slots 1601A, 1601B, 1601C allow the drive mechanism 113 of the leg assembly to 110 to be rotated more than 90 degrees in a clockwise or counter-clockwise direction by allowing the ratchet assembly 112 to operatively engage with each of the three ratchet lock bar slots 1601A, 1601B, 1601C to rotate the drive mechanism 113 over different ranges of angular motion.

Figure 17:
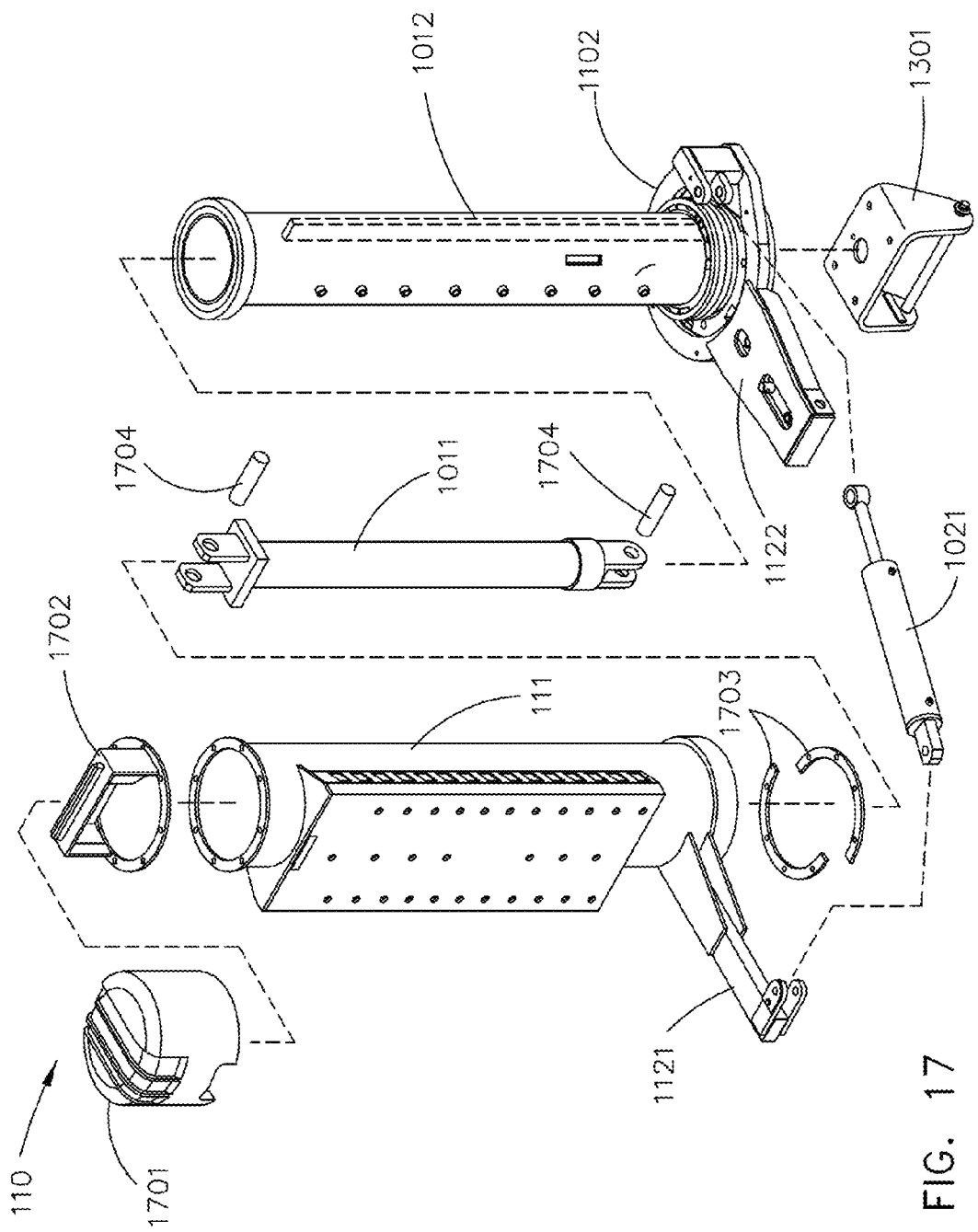
FIG. 17 shows an exploded view of a portion of an exemplary leg assembly of some embodiments.

Referring now to FIG. 17, an exploded view of a portion of an exemplary leg assembly 110 of some embodiments is shown. In some embodiments, the pivot yoke is attached to the bottom of the ratchet assembly (e.g., attached to the bottom of the ratchet lock gear 110, the bottom of the steering collar 1103, or the like). The leg cylinder housing 1012 may be attached to a top portion of the steering collar 1103. A bottom end of the leg cylinder 1011 may be attached to an interior portion of the leg cylinder housing 1012 by an attachment means 1704 (e.g., a pin or the like). A top end of the leg cylinder 1011 may be attached to the leg shackle 1702 by an attachment means 1704 (e.g., pin or the like). The outer leg housing 111 may enclose the leg cylinder housing, and the outer leg housing 111 may be attached to the steer ring 1102 through a retainer 1703. A steer cylinder bracket arm 1121 may be attached to the outer leg housing 111. A first end of the steer cylinder 1021 may be attached to the steer cylinder bracket arm 1121, and a second end of the steer cylinder 1021 may be attached to a bracket portion of the steer ring 1102. A leg cap 1701 may cover a top portion of the leg assembly 110 by attaching to a top portion of the outer leg housing 111 and/or the leg shackle 1702. The outer leg housing 111 may attach to the machine 101 or arm 813 (for embodiments which include leg and shoulder joint assemblies 810). In some embodiments, the outer leg housing 111 remain substantially stationary relative to the machine 101, whereas the leg cylinder 1011, the leg cylinder housing 1012, the steering collar 1103, the ratchet lock gear 1101, the steer ring 1102, and the pivot yoke 1301 are configured to rotate in unison relative to the outer leg housing 111 when the ratchet lock mechanism is in a locked position and when the steer cylinder 1021 is being extended or retracted.

Referring now to FIGS. 18-21, views of different positions 1800, 1900, 2000, 2100 of a portion of an exemplary leg assembly 110 during performance of various drive mechanism 113 rotational operations of an exemplary embodiment are depicted. The leg assembly may include a ratchet assembly 112 and a drive mechanism 113. In some embodiments, the ratchet assembly may include a steer cylinder 1021, a steer ring 1102, a ratchet lock gear 1101 (which may include a plurality of ratchet lock bar slots 1601), a steering collar 1103, a ratchet cylinder 1022, a ratchet lock bar 1023, a steer ring side structure 1122, and a steer cylinder bracket arm 1121.

Figure 18:
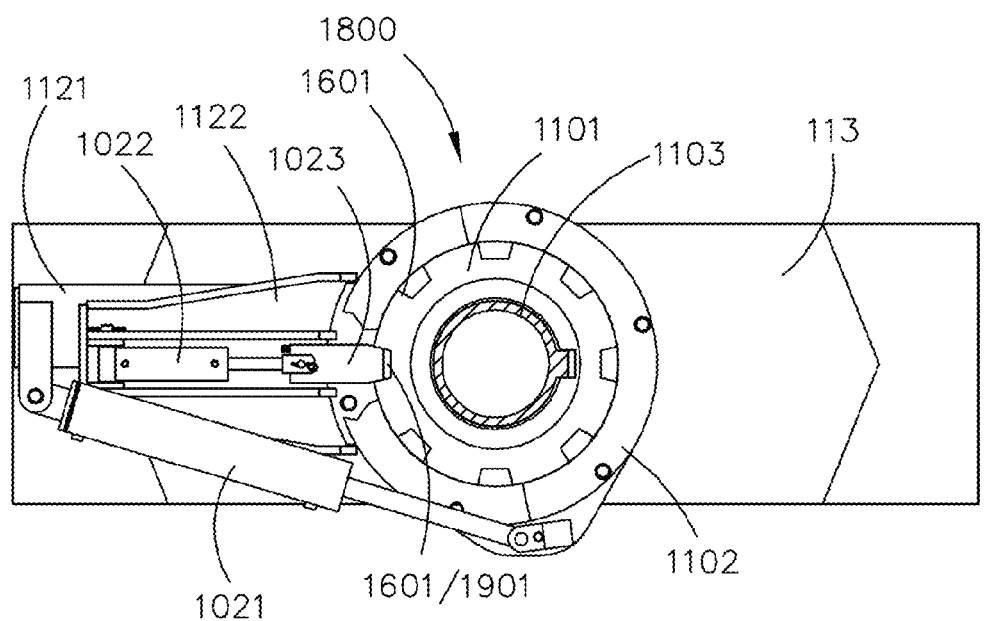
FIG. 18 shows a top view of the leg assembly at a first position of an exemplary embodiment.
Figure 19:
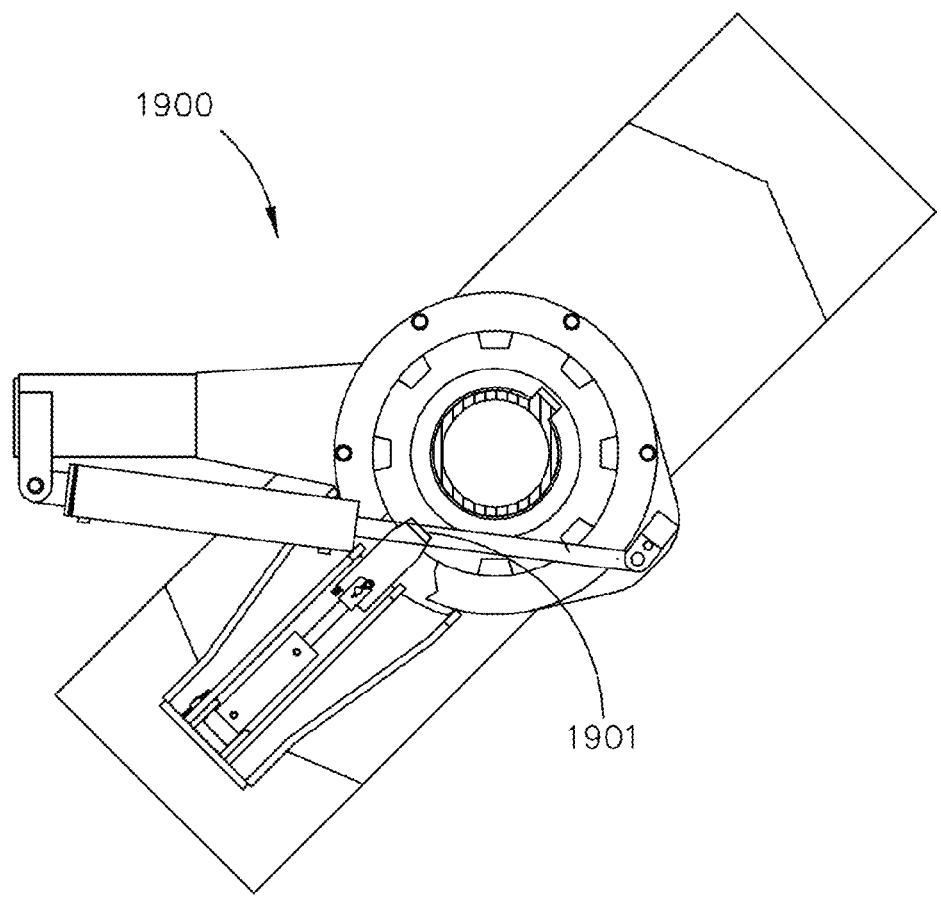
FIG. 19 shows a top view of the leg assembly at a second position of an exemplary embodiment.

As shown in FIG. 18, a top view of the leg assembly 110 is shown at a first position 1800 of an exemplary embodiment. In the first position 1800 of the exemplary embodiment, the ratchet lock mechanism is in a locked position; that is, the ratchet lock bar 1023 is engaged with a first particular ratchet lock bar slot 1601 (e.g., 1901) of the ratchet lock gear 1101. The first position may exemplarily correspond to the leg assembly 110 operating in a particular mode (e.g., a standard operating mode or a transport mode). Because the leg assembly 110 in the first position 1800 is in a locked position, extension or retraction of the steer cylinder 1021 will cause the steer ring 1102, the ratchet lock gear 1101, the steering collar 1103, and the drive mechanism 113 (which, for example, may be operatively coupled to the ratchet lock gear 1101 or the steering collar 1103) to rotate in unison with respect to the stationary outer leg housing 111. For example, the steer cylinder 1021 in the first position 1800 may extend causing the steer ring 1102, the ratchet lock gear 1101, the steering collar 1103, and the drive mechanism 113 to all rotate an amount (e.g., an amount associated with an amount of the extension of the steer cylinder 1021) to a second position 1900, as shown in FIG. 19. In some embodiments, when in a locked position, the amount that the steer ring 1102, the ratchet lock gear 1101, the steering collar 1103, and the drive mechanism 113 may be rotated may be limited by physical constraints (which, for example, may be associated with length of the steer cylinder 1021, extension of the steer cylinder 1021 physically being obstructed by the outer leg housing 111, or the like). Exemplary embodiments of the invention allow the physical rotation constraints to be overcome by unlocking the ratchet lock mechanism, restoring the extension (or retraction) of the steer cylinder 1021 to a predetermined (e.g., default) extension position, and allowing the steer ring 1102 to rotate around the ratchet lock gear 1101 while the extension of the steer cylinder 1021 is being restored such that the ratchet lock bar 1023 may be aligned with a second particular ratchet lock bar slot 2101; once the steer cylinder 1021 has been reset to the predetermined (e.g., default) extension position where the ratchet lock bar 1023 is aligned with the second particular ratchet lock bar slot 2101, the ratchet lock mechanism may be placed in a locked position by engaging the ratchet lock bar 1023 with the second particular ratchet lock bar slot 1601 such that the drive mechanism 113 may be operatively rotated in amounts exceeding the physical rotation constraints. This process may be performed iteratively to achieve any amount of desired rotation of the drive mechanism 113. Embodiments of the invention allow the drive mechanism 113 to be rotated further beyond the amount rotated between the first position 1800 and the second position 1900 by unlocking the ratchet lock mechanism (as shown in FIG. 20) and by resetting the steer cylinder 1021 and aligning the ratchet lock bar 1023 with a second particular ratchet lock bar slot 2101 (as shown in FIG. 21).

As shown in FIG. 19, a top view of the leg assembly 110 is shown at a second position 1900 of an exemplary embodiment. At the second position 1900, the steer cylinder 1021 has been extended which caused the steer ring 1102, the ratchet lock gear 1101, the steering collar 1103, and the drive mechanism 113 to all rotate an amount (e.g., an amount associated with an amount of the extension of the steer cylinder 1021) from the first position 1800. In some embodiments, the amount of rotation of the drive mechanism 113 between the first position and the second position may be between zero degrees and 90 degrees, and in a particular exemplary embodiment may comprise 72 degrees; however, it is fully contemplated that the amount of rotation between positions 1800, 1900 may comprise any suitable amount of rotation as permitted by any of various configurations of embodiments of the invention.

Figure 20:
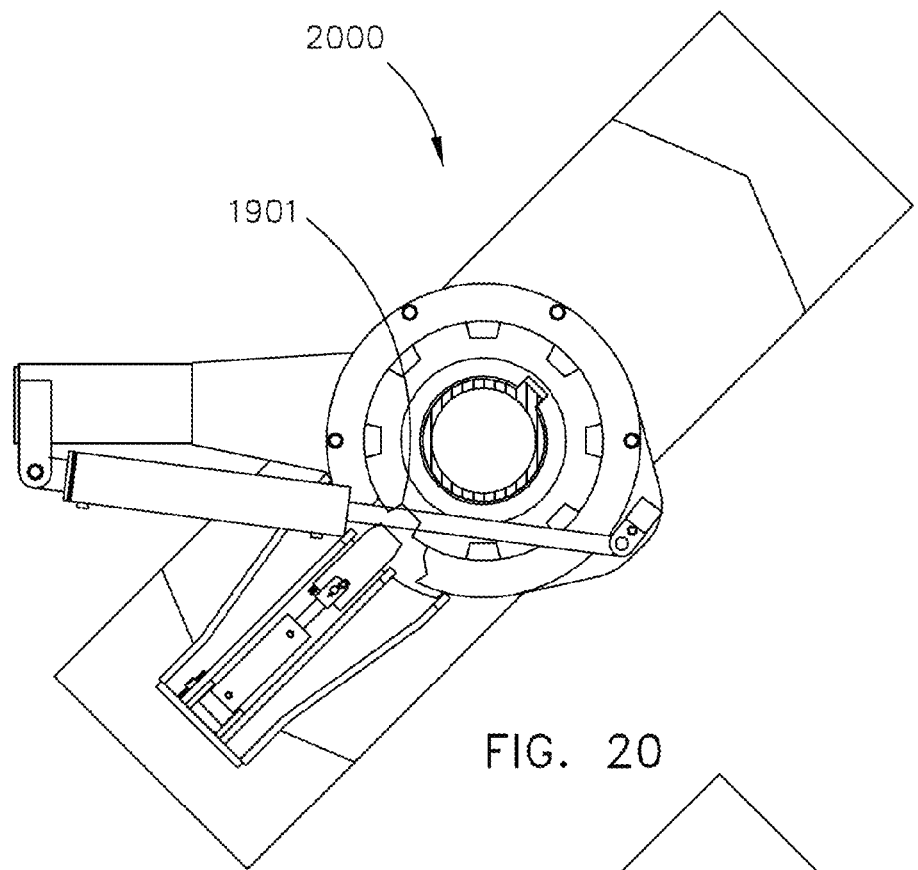
FIG. 20 shows a top view of the leg assembly at a third position of an exemplary embodiment.

Referring now to FIG. 20, a top view of the leg assembly 110 is shown at a third position 2000 of an exemplary embodiment. After the steer cylinder 1021 has been extended which caused the steer ring 1102, the ratchet lock gear 1101, the steering collar 1103, and the drive mechanism 113 to all rotate as shown in the second position 1900, some embodiments include unlocking the ratchet lock mechanism by disengaging the ratchet lock bar 1023 from the first particular ratchet lock bar slot 1901. Unlocking the ratchet lock mechanism allows the steer cylinder 1021 to be reset (e.g., retract or extend) back to a default position while not rotating the drive mechanism 113 during the reset operation. Resetting the steer cylinder allows the ratchet assembly 112 to rotate the drive mechanism 113 an additional amount beyond the amount of rotation between the first position 1800 and the second position 1900.

Figure 21:
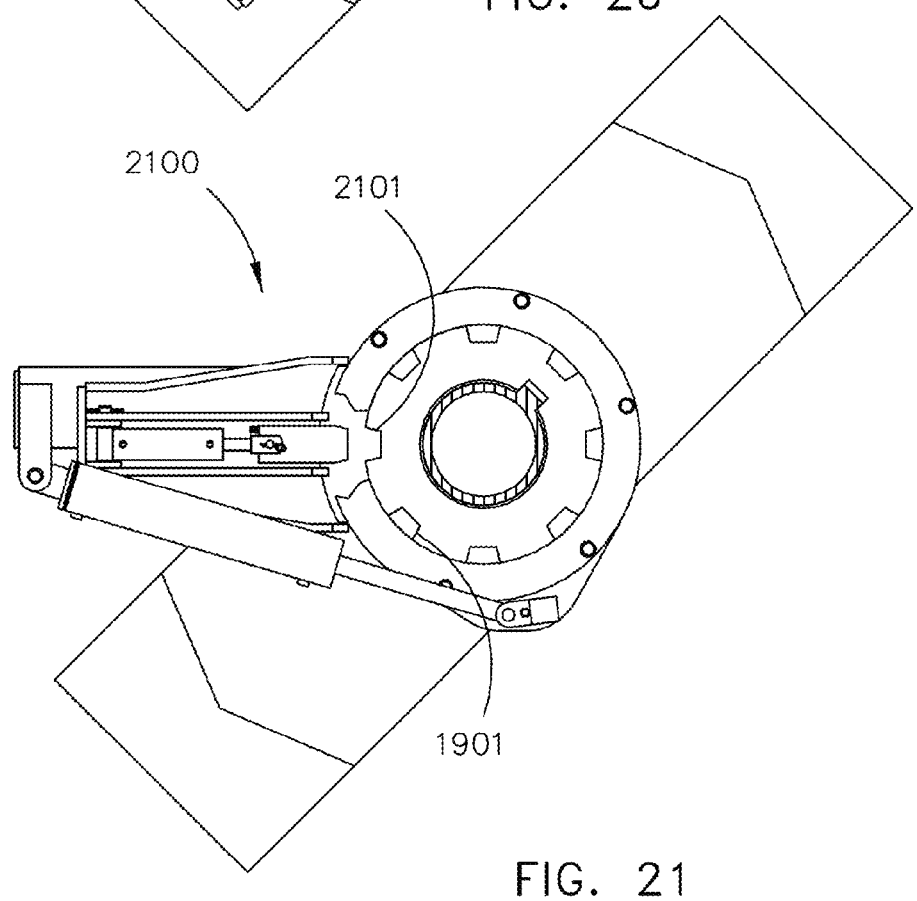
FIG. 21 shows a top view of the leg assembly at a fourth position of an exemplary embodiment.

Referring now to FIG. 21, a top view of the leg assembly 110 is shown at a fourth position 2100 of an exemplary embodiment. As shown in FIG. 21, the steer cylinder has been reset back to a default position where ratchet lock bar 1023 is in alignment with a second particular ratchet lock bar slot 2101. Performing the reset operation from the third position 2000 to the fourth position 2100 while the ratchet lock mechanism is unlocked includes retracting the steer cylinder 1021 which in turn causes the steer ring 1102 to rotate (e.g., clockwise, as shown) freely around the ratchet lock gear 1101 until the ratchet lock bar 1023 is aligned with the second particular ratchet lock bar slot 2101. Upon resetting the steer cylinder 1021, the ratchet lock mechanism may again be placed into a locked position by engaging the ratchet lock bar 1023 with the second particular ratchet lock bar slot 2101, and the operations depicted with respect to FIGS. 18-21 may be repeated so as to cause the drive mechanism 113 to be rotated an additional amount. In some embodiments, the operations depicted with respect to FIGS. 18-21 may be repeated iteratively as one or more cycles of operations so as to perform multiple cycles of rotating the drive mechanism 113 and resetting the steer cylinder 1021.

Figure 22:
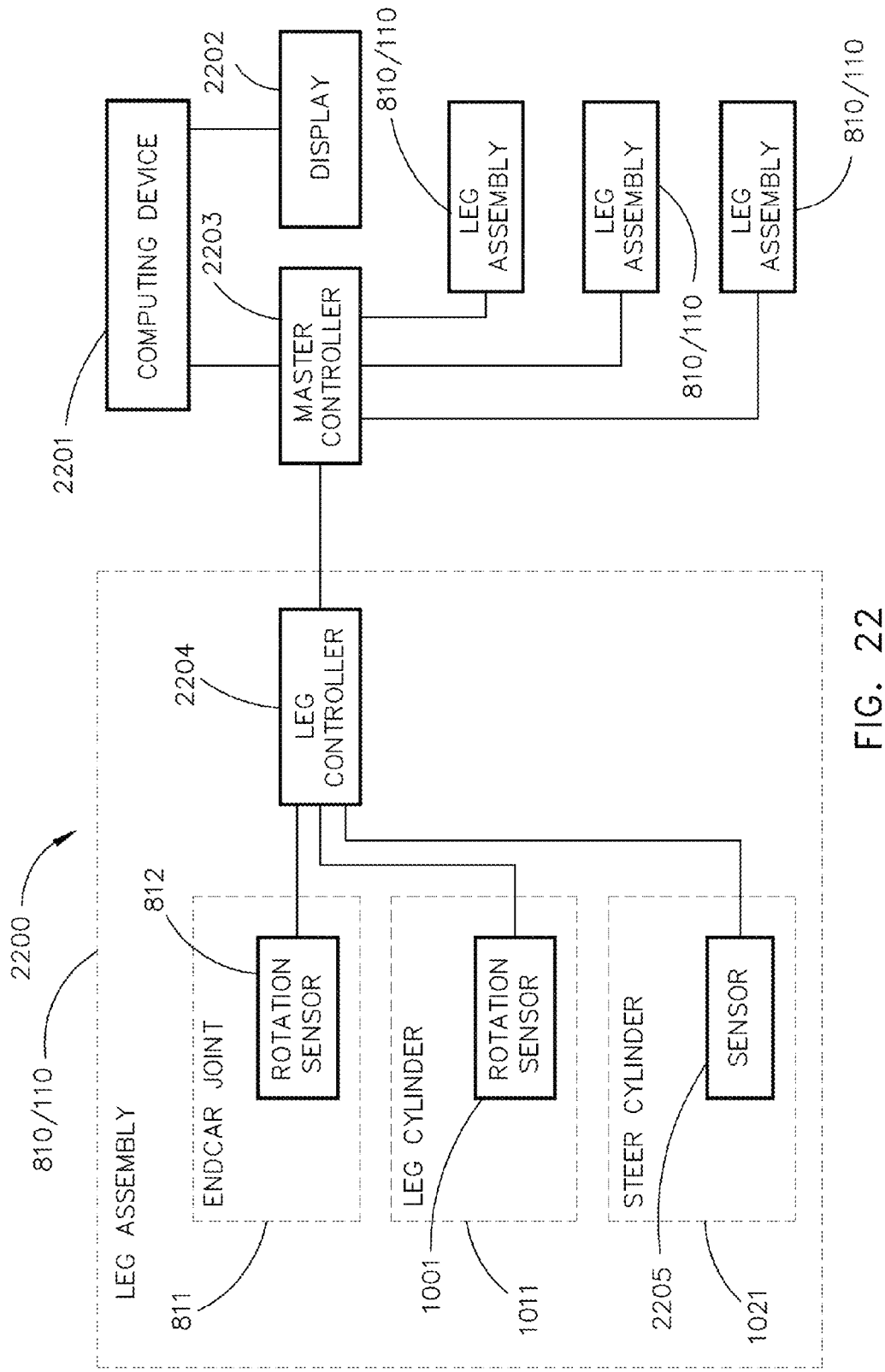
FIG. 22 shows an exemplary system diagram.

Referring now to FIG. 22, an exemplary diagram of an exemplary system 2200 (e.g., a control system) associated with a machine 101 of some embodiments is shown. The system 2200, or components thereof, may be configured for controlling the performance of operations of embodiments of the invention. In some embodiments, the system 2200 may include a computing device 2201, a user input and/or output device (e.g., a display 2201, touch-screen display, keyboard, buttons, mouse, switch, camera, joystick, speaker, or the like), one or more controllers (e.g., master controller 2203, leg controllers 2204, and/or the like), and one or more sensors (e.g., rotation sensor 812, rotation sensor 1001, at least one sensor 2205, and/or the like), which may be communicatively coupled to each other. In some embodiments, computing device 2201 and one or more controllers (e.g., master controller 2203, leg controllers 2204, and/or the like) is configured to control rotation operations (which, for example, may include operations for controlling the ratchet assembly 112) of the leg assemblies 110 or leg and shoulder joint assemblies 810 of a machine 101. In some embodiments, the computing device 2201 and the one or more controllers (e.g., master controller 2203, leg controllers 2204, and/or the like) is configured to control rotation operations based at least on user inputs (e.g., user selections received from a user input device), automated processes, and/or data received from the one or more sensors located in or on the leg assemblies 110 or leg and shoulder joint assemblies 810 of a machine 101. Further, in some embodiments, the computing device 2201 and the one or more controllers (e.g., master controller 2203, leg controllers 2204, and/or the like) may be configured to synchronize the control rotation operations of each of the leg assemblies 110 or leg and shoulder joint assemblies 810 such that all of the leg assemblies 110 or leg and shoulder joint assemblies 810 operate in a coordinated manner of driving, turning, lifting, or otherwise operating the machine 101.

In some embodiments, the shoulder sensor 812 is configured to sense (e.g., measure, detect, or the like) a degree of rotation of the arm 813 about the shoulder pivot 811 (sometimes referred to as an endcar joint). The shoulder sensor 812 may be configured to output or send data of the degree of rotation of the arm 813 about the shoulder pivot 811 to a computing device (e.g., 2201, or the like), one or more controllers (e.g., master controller 2203, leg controller 2204, or the like), or a combination thereof.

In some embodiments, the leg rotational sensor 1001 is configured to sense (e.g., measure, detect, or the like) a degree of rotation of the leg cylinder 1011. The leg rotational sensor 1001 may be configured to output or send data of the degree of rotation of the leg cylinder 1011 to one or more computing devices (e.g., 2201, or the like), one or more controllers (e.g., master controller 2203, leg controller 2204, or the like), or a combination thereof.

In some embodiments, at least one sensor 2205 is implemented within, attached to, or implemented within proximity to the steer cylinder 1021 or another portion of the ratchet lock mechanism (e.g., the ratchet cylinder 1022, the ratchet lock bar 1023, or the ratchet lock gear 1101). In some embodiments, the at least one sensor 2205 is configured to sense (e.g., measure, detect, or the like) whether the ratchet lock bar 1023 is aligned with a particular ratchet lock bar slot 1601. In exemplary embodiments, when the ratchet lock mechanism is in an unlocked position, a single sensor 2205 senses a distance (e.g., a circumferential distance) of how far the ratchet lock bar 1023 has traveled around the ratchet lock gear 1101; in other exemplary embodiments, when the ratchet lock mechanism is in an unlocked position, a single sensor 2205 senses a degree of rotation traveled around the ratchet lock gear 1101; in still other exemplary embodiments, a plurality of sensors are implemented throughout the ratchet lock mechanism such that each of the plurality of ratchet lock bar slots 1601 has an associated sensor configured to sense when the ratchet lock bar 1023 is aligned with a particular ratchet lock bar slot 1601. Further, in some embodiments, the at least one sensor 2205 may be configured to output or send data associated with the alignment or non-alignment of the ratchet lock bar 1023 relative to the plurality of ratchet lock bar slots 1601 to one or more computing devices (e.g., 2201, or the like), one or more controllers (e.g., master controller 2203, leg controller 2204, or the like), or a combination thereof.

In a particular exemplary embodiment, the computing device 2201 may receive a user selection from an input device to rotate (e.g., counter-clockwise or clockwise) one or more drive mechanisms 113 of one or more leg assemblies 110 (e.g., a single drive mechanism 113, a pair of drive mechanisms 113, or all of the drive mechanisms 113) by a selected amount. Upon receipt of the user selection to rotate the one or more drive mechanisms 113 by a selected amount, the computing device 2201 may instruct (e.g., send one or more signals to) the master controller 2203. Upon receiving instructions from the computing device 2201, the master controller 2203 may determine which (e.g., one, some, or all) of a plurality of leg controllers 2204 to send instructions (e.g., based on whether particular leg controller 2204 is required for performing the user's selected rotation operation), and likewise, the master controller 2203 may instruct the determined leg controllers 2204 to perform a series of operations to complete the user's selection to rotate the one or more drive mechanisms 113. For example, for a particular leg assembly 110, the leg controller 2203 may verify that the ratchet lock mechanism is in a locked position or perform operations for correctly aligning and locking the ratchet lock mechanism. The leg controller 2203 may cause the steer cylinder 1021 to extend or retract in the selected direction until a predetermined value (e.g., based on feedback received from the leg rotational sensor 1001, the at least one sensor 2205 associated with the steer cylinder 1021, or a combination thereof) is reached. Once the predetermined value has been reached, the leg controller 2204 causes the ratchet lock mechanism to unlock (e.g., by causing the ratchet cylinder 1022 to retract the ratchet lock bar 1023 from the corresponding ratchet lock bar slot 1601 of the ratchet lock gear 1101). Once the ratchet lock mechanism is unlocked, the leg controller 2204 may cause the steer cylinder 1021 to retract or extend in the opposite direction (i.e., opposite to the selected direction) until a predetermined value (e.g., based on feedback from the at least one sensor 2205 associated with the steer cylinder 1021 indicating that the ratchet lock bar 1023 is aligned with a particular ratchet lock bar slot 1601) is reached. Once the predetermined value is reached, the leg controller 2204 may cause the ratchet lock mechanism to lock. Once the ratchet lock mechanism is locked, the leg controller 2204 may cause the steer cylinder 1021 to extend or retract in the selected direction until the user selected amount of rotation is reached (e.g., based on feedback received from the leg rotational sensor 1001).

While a particular exemplary embodiment has been described above utilizing the leg controllers 2204, the master controller 2203, and the computing device 2201, it is fully contemplated that in other embodiments the above-described functions of the leg controllers 2204, the master controller 2203, and the computing device 2201 may be performed by a single computing device, a single controller, a single processor, a device executing non-transitory computer-readable instructions, or any combination of coupled computing devices, controllers, processors, or devices executing non-transitory computer-readable instructions.

In the present disclosure, the methods, operations, and/or functionality disclosed may be implemented as sets of instructions or software stored in non-transitory computer readable medium and executable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the disclosed subject matter. The accompanying claims may present elements of the various steps in a sample order, and are not necessarily meant to be limited to the specific order or hierarchy presented.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A cylinder assembly, comprising:
   a cylinder end having a cylinder end opening;
   a cylinder barrel attached to the cylinder end;
   a piston residing within the cylinder barrel, wherein an opening through the piston forms a sleeve passing through a center portion of the piston, the sleeve having a non-circular cross-section;
   a rod attached at one end to the piston and at a second end to a rod end, the rod extending out of the cylinder barrel, the rod being configured to extend or retract, the rod further being configured to rotate with respect to the cylinder barrel and the cylinder end, wherein an opening in the rod further forms the sleeve passing through a central interior portion of the rod; and
   a rotation position shaft, a protruding end of the rotation position shaft passing through the cylinder end opening, a portion of the rotation position shaft further passing through the sleeve formed by the opening through the piston and the opening in the rod, the portion of the rotation position shaft passing through the sleeve having a cross-sectional shape corresponding to the non-circular cross-section of the sleeve, the protruding end of the rotation position shaft being free to rotate within the cylinder end opening in response to a rotation of the rod, the portion of the rotation position shaft being free to slide within the sleeve in response to an extension or retraction of the rod.

2. The cylinder assembly of claim 1, further comprising:
   a cylinder rotational sensor positioned to sense a rotation of the protruding end of the rotation position shaft.

3. The cylinder assembly of claim 2, wherein the cylinder rotational sensor is mounted to the cylinder end.

4. The cylinder assembly of claim 3, wherein the cylinder rotational sensor includes a rotary sensor portion in registry with the protruding end of the rotation position shaft, the rotary sensor portion being configured to rotate in unison with the protruding end of the rotation position shaft.

5. The cylinder assembly of claim 2, wherein the cylinder rotational sensor is configured to measure the rotation of the protruding end of the rotation position shaft relative to the cylinder barrel and the cylinder end.

6. The cylinder assembly of claim 2, wherein the cylinder rotational sensor includes a main sensor body portion and a rotary sensor portion.

7. The cylinder assembly of claim 1, wherein the sleeve has a square cross-section.

8. The cylinder assembly of claim 1, wherein the cylinder assembly is implemented as a leg cylinder.

9. The cylinder assembly of claim 1, wherein the rotation position shaft is configured to rotate in unison with the rod end, the rod, and the piston while the cylinder barrel and the cylinder end remain rotationally stationary.

10. The cylinder assembly of claim 1, wherein the protruding end is held in place by a retaining ring.

11. The cylinder assembly of claim 10, wherein the protruding end is held in place by the retaining ring while allowing the rotation position shaft to freely rotate.

12. The cylinder assembly of claim 10, wherein the rotation position shaft passes through the cylinder end, the retaining ring, and at least one bearing.

13. The cylinder of claim 1, wherein a rotation of the rod end, the rod, and the piston induces a rotation in the rotation position shaft.

14. A cylinder assembly, comprising:
    a cylinder end having a cylinder end opening;
    a cylinder barrel attached to the cylinder end;
    a piston residing within the cylinder barrel, wherein an opening through the piston forms a sleeve passing through a portion of the piston, the sleeve having a cross-section;
    a rod attached at one end to the piston and at a second end to a rod end, the rod extending out of the cylinder barrel, the rod being configured to extend or retract, the rod further being configured to rotate with respect to the cylinder barrel and the cylinder end, wherein an opening in the rod further forms the sleeve passing through an interior portion of the rod; and
    a shaft, a protruding end of the shaft passing through the cylinder end opening, a portion of the shaft further passing through the sleeve formed by the opening through the piston and the opening in the rod, the portion of the shaft passing through the sleeve having a cross-sectional shape corresponding to the cross-section of the sleeve, the protruding end of the shaft being free to rotate within the cylinder end opening in response to a rotation of the rod, the portion of the shaft being free to slide within the sleeve in response to an extension or retraction of the rod.

15. The cylinder assembly of claim 14, further comprising:
    a cylinder rotational sensor positioned to sense a rotation of the protruding end of the shaft.

16. The cylinder assembly of claim 14, wherein the shaft is configured to rotate in unison with the rod end, the rod, and the piston while the cylinder barrel and the cylinder end remain rotationally stationary.

17. The cylinder assembly of claim 14, further comprising a retaining ring, wherein the protruding end is held in place by the retaining ring while allowing the rotation position shaft to freely rotate.

18. The cylinder assembly of claim 17, further comprising at least one bearing, wherein the shaft passes through the cylinder end, the retaining ring, and the at least one bearing.

* * * * *